(12) United States Patent
Hosseini-Benhangi et al.

(10) Patent No.: US 12,087,983 B2
(45) Date of Patent: Sep. 10, 2024

(54) CARBON DIOXIDE REDOX FLOW BATTERY HAVING A BI-FUNCTIONAL NEGATIVE ELECTRODE

(71) Applicant: Agora Energy Technologies Ltd., Vancouver (CA)

(72) Inventors: Pooya Hosseini-Benhangi, Vancouver (CA); Christina Gyenge, Vancouver (CA); Elod Gyenge, Vancouver (CA)

(73) Assignee: AGORA ENERGY TECHNOLOGIES LTD., Vancouver (CA)

( * ) Notice: Subject to any disclaimer, the term of this patent is extended or adjusted under 35 U.S.C. 154(b) by 187 days.

(21) Appl. No.: 17/348,544

(22) Filed: Jun. 15, 2021

(65) Prior Publication Data
US 2021/0399328 A1 Dec. 23, 2021

Related U.S. Application Data

(60) Provisional application No. 63/041,612, filed on Jun. 19, 2020.

(51) Int. Cl.
*H01M 8/00* (2016.01)
*H01M 8/18* (2006.01)
(Continued)

(52) U.S. Cl.
CPC ............. *H01M 8/188* (2013.01); *H01M 8/22* (2013.01); *H01M 2004/027* (2013.01)

(58) Field of Classification Search
CPC ........ H01M 8/188; H01M 8/184; H01M 8/18; H01M 8/20; H01M 8/22; H01M 8/225; H01M 2004/027; H01M 2004/021
See application file for complete search history.

(56) References Cited

U.S. PATENT DOCUMENTS

| | | | |
|---|---|---|---|
| 9,236,640 B2 * | 1/2016 | Takechi | H01M 12/06 |
| 2018/0219240 A1 * | 8/2018 | Gyenge | H01M 8/20 |

OTHER PUBLICATIONS

E. Hwang, H. Kim, H. Park, T. Lim, Y.-T. Kim, S.H. Ahn, S.-K. Kim, PdSn Alloy Electrocatalysts for Interconversion Between Carbon Dioxide and Formate/Formic Acid, Journal of Nanoscience and Nanotechnology, 17 (2017) 7547-7555.
(Continued)

*Primary Examiner* — Raymond Alejandro
(74) *Attorney, Agent, or Firm* — Davis Wright Tremaine LLP; Heather M. Colburn

(57) ABSTRACT

A redox flow battery ("CRB") performs as an energy storage system and has a negative electrode that directly utilizes $CO_2$ in the battery charge step as an active species instead of metals. The CRB also has a positive electrode utilizing a metallic or non-metallic redox species, and a cation exchange membrane in between the negative and positive electrodes. The negative electrode comprises a porous base layer, a porous intermediate layer containing a metal oxide and a bi-functional catalyst layer for electrochemical reduction of $CO_2$ or carbonate to formate and for formate oxidation to either carbonate or $CO_2$. The bi-functional catalyst can be a PdSn based catalyst, such as PdSn, PdSnIn, and PdSnPb. The metal oxide in the intermediate layer acts as a catalyst support and can be a non-Platinum group metal (PGM) oxide, such as $LaCoO_3$ or $LaNiO_3$.

19 Claims, 16 Drawing Sheets

(51) Int. Cl.
    H01M 8/22   (2006.01)
    H01M 4/02   (2006.01)

(56) References Cited

OTHER PUBLICATIONS

G. Samjeské, M. Osawa, Current Oscillations during Formic Acid Oxidation on a Pt Electrode: Insight into the Mechanism by Time-Resolved IR Spectroscopy, Angewandte Chemie International Edition, 44 (2005) 5694-5698.
T. Seiyama, N. Yamazoe, K. Eguchi, Characterization and activity of some mixed metal oxide catalysts, Industrial & Engineering Chemistry Product Research and Development, 24 (1985) 19-27.
J.M.D. Tascon, L.G. Tejuca, Adsorption of CO on the Perovskite-Type Oxide LaCoO3, Zeitschrift für Physikalische Chemie, 121 (1980) 63-78.
Q. Tang, F. Chen, T. Jin, L. Guo, Q. Wang, H. Liu, Alloying in inverse CeO2/Pd nanoparticles to enhance the electrocatalytic activity for the formate oxidation reaction, Journal of Materials Chemistry A, 7 (2019) 22996-23007.
A.H. Miller, J. Ruggeri, A. Marchionni, M. Bellini, V.M. Pagliaro, C. Bartoli, A. Pucci, E. Passaglia, F. Vizza, Improving the Energy Efficiency of Direct Formate Fuel Cells with a Pd/C-CeO2 Anode Catalyst and Anion Exchange Ionomer in the Catalyst Layer, Energies, 11 (2018).
A.V. Salker, N.J. Choi, J.H. Kwak, B.S. Joo, D.-D. Lee, Thick films of In, Bi and Pd metal oxides impregnated in LaCoO3 perovskite as carbon monoxide sensor, Sensors and Actuators B: Chemical, 106 (2005) 461-467.
M. Ghasdi, H. Alamdari, CO sensitive nanocrystalline LaCoO3 perovskite sensor prepared by high energy ball milling, Sensors and Actuators B: Chemical, 148 (2010) 478-485.
E.J. Peterson, A.T. DeLaRiva, S. Lin, R.S. Johnson, H. Guo, J.T. Miller, J. Hun Kwak, C.H.F. Peden, B. Kiefer, L.F. Allard, F.H. Ribeiro, A.K. Datye, Low-temperature carbon monoxide oxidation catalysed by regenerable atomically dispersed palladium on alumina, Nature Communications, 5 (2014) 4885.
K. Bejtka, J. Zeng, A. Sacco, M. Castellino, S. Hernandez, M.A. Farkhondehfal, U. Savino, S. Ansaloni, C.F. Pirri, A. Chiodoni, Chainlike Mesoporous SnO2 as a Well-Performing Catalyst for Electrochemical CO2 Reduction, ACS Applied Energy Materials, 2 (2019) 3081-3091.
Y. Hori, H. Wakebe, T. Tsukamoto, O. Koga, Electrocatalytic process of CO selectivity in electrochemical reduction of CO2 at metal electrodes in aqueous media, Electrochimica Acta, 39 (1994) 1833-1839.
W. Luo, W. Xie, M. Li, J. Zhang, A. Zuttel, 3D hierarchical porous indium catalyst for highly efficient electroreduction of CO2, Journal of Materials Chemistry A, 7 (2019) 4505-4515.
A.S. Kumawat, A. Sarkar, Comparative Study of Carbon Supported Pb, Bi and Sn Catalysts for Electroreduction of Carbon Dioxide in Alkaline Medium, Journal of The Electrochemical Society, 164 (2017) H1112-H1120.
J.E. Pander, J.W.J. Lum, B.S. Yeo, The importance of morphology on the activity of lead cathodes for the reduction of carbon dioxide to formate, Journal of Materials Chemistry A, 7 (2019) 4093-4101.
H.-R.M. Jhong, S. Ma, P.J.A. Kenis, Electrochemical conversion of CO2 to useful chemicals: current status, remaining challenges, and future opportunities, Current Opinion in Chemical Engineering, 2 (2013) 191-199.
N. Yoshihara, M. Arita, M. Noda, Electrolyte Dependence for the Electrochemical CO2 Reduction Activity on Cu(111) Electrodes, Chemistry Letters, 46 (2016) 125-127.
Y.-W. Rhee, S.Y. Ha, R.I. Masel, Crossover of formic acid through Nation® membranes, Journal of Power Sources, 117 (2003) 35-38.
Q.-Y. Bi, J.-D. Lin, Y.-M. Liu, X.-L. Du, J.-Q. Wang, H.-Y. He, Y. Cao, An Aqueous Rechargeable Formate-Based Hydrogen Battery Driven by Heterogeneous Pd Catalysis, Angewandte Chemie International Edition, 53 (2014) 13583-13587.
I.S. Kwon, T.T. Debela, I.H. Kwak, H.W. Seo, K. Park, D. Kim, S.J. Yoo, J.-G. Kim, J. Park, H.S. Kang, Selective electrochemical reduction of carbon dioxide to formic acid using indium-zinc bimetallic nanocrystals, Journal of Materials Chemistry A, 7 (2019) 22879-22883.
Z. Li, M.S. Pan, L. Su, P.-C. Tsai, A.F. Badel, J.M. Valle, S.L. Eiler, K. Xiang, F.R. Brushett, Y.-M. Chiang, Air-Breathing Aqueous Sulfur Flow Battery for Ultralow-Cost Long-Duration Electrical Storage, Joule, 1 (2017) 306-327.
K. Wang, Y. Wu, X. Cao, L. Gu, J. Hu, A Zn—CO2 Flow Battery Generating Electricity and Methane, Advanced Functional Materials, 30 (2020) 1908965.
T. Maeda, T.K. Wood, Formate detection by potassium permanganate for enhanced hydrogen production in Escherichia coli, International Journal of Hydrogen Energy, 33 (2008) 2409-2412.
A. Löwe, M. Schmidt, F. Bienen, D. Kopljar, N. Wagner, E. Klemm, Optimizing Reaction Conditions and Gas Diffusion Electrodes Applied in the CO2 Reduction Reaction to Formate to Reach Current Densities up to 1.8 A cm-2, ACS Sustainable Chemistry & Engineering, 9 (2021) 4213-4223.
Y. Chen, A. Vise, W. Klein, F. Cetinbas, D. Myers, W. Smith, T. Deutsch, K. Neyerlin, A Robust, Scalable Platform for the Electrochemical Conversion of CO2 to Formate: Identifying Pathways to Higher Energy Efficiencies, ACS Energy Letters, 5 (2020) 1825-1833.
P. Hosseini-Benhangi, C. C. Gyenge, E. L. Gyenge, The carbon dioxide redox flow battery: Bifunctional CO2 reduction formate oxidation electrocatalysis on binary and ternary catalysts, Journal of Power Sources, 495 (2021) 229752.
G.A. Olah, G.K.S. Prakash, A. Goeppert, Anthropogenic Chemical Carbon Cycle for a Sustainable Future, Journal of the American Chemical Society, 133 (2011) 12881-12898.
M. Peters, B. Köhler, W. Kuckshinrichs, W. Leitner, P. Markewitz, T.E. Müller, Chemical Technologies for Exploiting and Recycling Carbon Dioxide into the Value Chain, ChemSusChem, 4 (2011) 1216-1240.
P. Markewitz, W. Kuckshinrichs, W. Leitner, J. Linssen, P. Zapp, R. Bongartz, A. Schreiber, T.E. Müller, Worldwide Innovations in the development of carbon capture technologies and the utilization of CO2, Energy & Environmental Science, 5 (2012) 7281-7305.
I.R.E. Agency, Renewable Power Generation Costs in 2018, Abu Dhabi, 2019.
C. Hepburn, E. Adlen, J. Beddington, E.A. Carter, S. Fuss, N. Mac Dowell, J.C. Minx, P. Smith, C.K. Williams, The technological and economic prospects for CO2 utilization and removal, Nature, 575 (2019) 87-97.
J. Xie, Y. Wang, Recent Development of CO2 Electrochemistry from Li—CO2 Batteries to Zn—CO2 Batteries, Accounts of Chemical Research, 52 (2019) 1721-1729.
W.I. Al Sadat, L.A. Archer, The O2-assisted Al/CO2 electrochemical cell: A system for CO2 capture/conversion and electric power generation, Science Advances, 2 (2016) e1600968.
J. Xie, X. Wang, J. Lv, Y. Huang, M. Wu, Y. Wang, J. Yao, Reversible Aqueous Zinc-CO2 Batteries Based on CO2—HCOOH Interconversion, Angewandte Chemie International Edition, 57 (2018) 16996-17001.
K. Németh, G. Srajer, CO2/oxalate cathodes as safe and efficient alternatives in high energy density metal-air type rechargeable batteries, RSC Advances, 4 (2014) 1879-1885.
K. Takechi, T. Shiga, Gas battery comprising carbon dioxide gas as a positive electrode active material and method of use of gas battery U.S. Pat. No. 9,236,640B2, (2016).
L.A. Archer, S. Xu, W.I. Al Sadat, Carbon dioxide assisted metal-oxygen battery and related method U.S. Pat. No. 10,026,958B2, (2018).
P. Albertus, V. Viswanathan, J.F. Christensen, B. Kozinsky, R. Sanchez-Carrera, T. Lohmann, High specific-energy Li/O2—CO2 battery, EP2792015B1, (2017).
G. Planté, The storage of electrical energy: and researches in the effects created by currents combining quantity with high tension, Whittaker&Co., London, 1887.

(56) References Cited

OTHER PUBLICATIONS

X. Han, X. Li, J. White, C. Zhong, Y. Deng, W. Hu, T. Ma, Metal-Air Batteries: From Static to Flow System, Advanced Energy Materials, 8 (2018) 1801396.

H.D. Yoo, E. Markevich, G. Salitra, D. Sharon, D. Aurbach, On the challenge of developing advanced technologies for electrochemical energy storage and conversion, Materials Today, 17 (2014) 110-121.

P. Kurzweil, Gaston Plante and his invention of the lead-acid battery—The genesis of the first practical rechargeable battery, Journal of Power Sources, 195 (2010) 4424-4434.

B.K. Sovacool, S.H. Ali, M. Bazilian, B. Radley, B. Nemery, J. Okatz, D. Mulvaney, Sustainable minerals and metals for a low-carbon future, Science, 367 (2020) 30-33.

D. Larcher, J.M. Tarascon, Towards greener and more sustainable batteries for electrical energy storage, Nature Chemistry, 7 (2015) 19-29.

E.L. Gyenge, Redox Flow Battery With Carbon Dioxide Based Redox Couple, U.S. Pat. No. 10,854,906, Dec. 1, 2020.

S. Lee, J.D. Ocon, Y.-i. Son, J. Lee, Alkaline $CO_2$ Electrolysis toward Selective and Continuous $HCOO^-$ Production over $SnO_2$ Nanocatalysts, The Journal of Physical Chemistry C, 119 (2015) 4884-4890.

T.T. Cheng, E.L. Gyenge, Novel catalyst-support interaction for direct formic acid fuel cell anodes: Pd electrodeposition on surface-modified graphite felt, Journal of Applied Electrochemistry, 39 (2009) 1925-1938.

A. Jameson, E. Gyenge, Halogens as Positive Electrode Active Species for Flow Batteries and Regenerative Fuel Cells, Electrochemical Energy Reviews, 3 (2020) 431-465.

B. Huskinson, M.P. Marshak, C. Suh, S. Er, M.R. Gerhardt, C.J. Galvin, X. Chen, A. Aspuru-Guzik, R.G. Gordon, M.J. Aziz, A metal-free organic-inorganic aqueous flow battery, Nature, 505 (2014) 195-198.

S. Biswas, A. Senju, R. Mohr, T. Hodson, N. Karthikeyan, K.W. Knehr, A.G. Hsieh, X. Yang, B.E. Koel, D.A. Steingart, Minimal architecture zinc-bromine battery for low cost electrochemical energy storage, Energy & Environmental Science, 10 (2017) 114-120.

L. Wang, X. Wang, J. Liu, H. Yang, C. Fu, Y. Xia, T. Liu, A rechargeable metal-free full-liquid sulfur-bromine battery for sustainable energy storage, Journal of Materials Chemistry A, 6 (2018) 20737-20745.

D. Kim, Y. Kim, Y. Lee, J. Jeon, 1,2-Dimethylimidazole based bromine complexing agents for vanadium bromine redox flow batteries, International Journal of Hydrogen Energy, 44 (2019) 12024-12032.

W. Zhang, Y. Hu, L. Ma, G. Zhu, Y. Wang, X. Xue, R. Chen, S. Yang, Z. Jin, Progress and Perspective of Electrocatalytic $CO_2$ Reduction for Renewable Carbonaceous Fuels and Chemicals, Advanced Science, 5 (2018) 1700275.

M. König, J. Vaes, E. Klemm, D. Pant, Solvents and Supporting Electrolytes in the Electrocatalytic Reduction of $CO_2$, Science, 19 (2019) 135-160.

P. Hosseini-Benhangi, C.H. Kung, A. Alfantazi, E.L. Gyenge, Controlling the Interfacial Environment in the Electrosynthesis of $MnO_x$ Nanostructures for High-Performance Oxygen Reduction/Evolution Electrocatalysis, ACS Applied Materials & Interfaces, 9 (2017) 26771-26785.

P.H. Benhangi, A. Alfantazi, E. Gyenge, Manganese Dioxide-based Bifunctional Oxygen Reduction/Evolution Electrocatalysts: Effect of Perovskite Doping and Potassium Ion Insertion, Electrochimica Acta, 123 (2014) 42-50.

P. Hosseini-Benhangi, M.A. Garcia-Contreras, A. Alfantazi, E.L. Gyenge, Method for Enhancing the Bifunctional Activity and Durability of Oxygen Electrodes with Mixed Oxide Electrocatalysts: Potential Driven Intercalation of Potassium, Journal of The Electrochemical Society, 162 (2015) F1356-F1366.

S.Y. Choi, S.K. Jeong, H.J. Kim, I.-H. Baek, K.T. Park, Electrochemical Reduction of Carbon Dioxide to Formate on Tin-Lead Alloys, ACS Sustainable Chemistry & Engineering, 4 (2016) 1311-1318.

C.E. Moore, E.L. Gyenge, Tuning the Composition of Electrodeposited Bimetallic Tin-Lead Catalysts for Enhanced Activity and Durability in Carbon Dioxide Electroreduction to Formate, ChemSusChem, 10 (2017) 3512-3519.

L. An, R. Chen, Direct formate fuel cells: A review, Journal of Power Sources, 320 (2016) 127-139.

R.-H. Guo, C.-F. Liu, T.-C. Wei, C.-C. Hu, Electrochemical behavior of $CO_2$ reduction on palladium nanoparticles: Dependence of adsorbed CO on electrode potential, Electrochemistry Communications, 80 (2017) 24-28.

M. Grdeń, M. Łukaszewski, G. Jerkiewicz, A. Czerwiński, Electrochemical behaviour of palladium electrode: Oxidation, electrodissolution and ionic adsorption, Electrochimica Acta, 53 (2008) 7583-7598.

K. Ohkawa, K. Hashimoto, A. Fujishima, Y. Noguchi, S. Nakayama, Electrochemical reduction of carbon dioxide on hydrogenstoring materials: Part 1. The effect of hydrogen absorption on the electrochemical behavior on palladium electrodes, Journal of Electroanalytical Chemistry, 345 (1993) 445-456.

T. Takamura, F. Mochimaru, Adsorption and oxidation of formate on palladium in alkaline solution, Electrochimica Acta, 14 (1969) 111-119.

J. John, H. Wang, E.D. Rus, H.D. Abruña, Mechanistic Studies of Formate Oxidation on Platinum in Alkaline Medium, The Journal of Physical Chemistry C, 116 (2012) 5810-5820.

X. Min, M.W. Kanan, Pd-Catalyzed Electrohydrogenation of Carbon Dioxide to Formate: High Mass Activity at Low Overpotential and Identification of the Deactivation Pathway, Journal of the American Chemical Society, 137 (2015) 4701-4708.

S. Pérez-Rodríguez, N. Rillo, M.J. Lázaro, E. Pastor, Pd catalysts supported onto nanostructured carbon materials for $CO_2$ valorization by electrochemical reduction, Applied Catalysis B: Environmental, 163 (2015) 83-95.

B. Beden, A. Bewick, M. Razaq, J. Weber, On the nature of reduced $CO_2$: An IR spectroscopic investigation, Journal of Electroanalytical Chemistry and Interfacial Electrochemistry, 139 (1982) 203-206.

Y. Hori, Electrochemical $CO_2$ Reduction on Metal Electrodes, in: C.G. Vayenas, R.E. White, M.E. Gamboa-Aldeco (Eds.) Modern Aspects of Electrochemistry, Springer New York, New York, NY, 2008, pp. 89-189.

T. Zheng, D. Stacchiola, D.K. Saldin, J. James, D.S. Sholl, W.T. Tysoe, The structure of formate species on Pd(111) calculated by density functional theory and determined using low energy electron diffraction, Surface Science, 574 (2005) 166-174.

M. Choun, J. Lee, Electro-oxidation of mixed reactants of ethanol and formate on Pd/C in alkaline fuel cells, Journal of Energy Chemistry, 25 (2016) 683-690.

Q. Wang, H. Dong, H. Yu, Development of rolling tin gas diffusion electrode for carbon dioxide electrochemical reduction to produce formate in aqueous electrolyte, Journal of Power Sources, 271 (2014) 278-284.

S.D. Kapusta, N. Hackerman, Anodic passivation of tin in slightly alkaline solutions, Electrochimica Acta, 25 (1980) 1625-1639.

A. Palacios-Padrós, F. Caballero-Briones, I. Díez-Pérez, F. Sanz, Tin passivation in alkaline media: Formation of SnO microcrystals as hydroxyl etching product, Electrochimica Acta, 111 (2013) 837-845.

F.D. Mayer, P. Hosseini-Benhangi, C.M. Sánchez-Sánchez, E. Asselin, E.L. Gyenge, Scanning electrochemical microscopy screening of $CO_2$ electroreduction activities and product selectivities of catalyst arrays, Communications Chemistry, 3 (2020) 1-9.

T. Reda, C.M. Plugge, N.J. Abram, J. Hirst, Reversible interconversion of carbon dioxide and formate by an electroactive enzyme, Proc Natl Acad Sci U S A, 105 (2008) 10654-10658.

\* cited by examiner

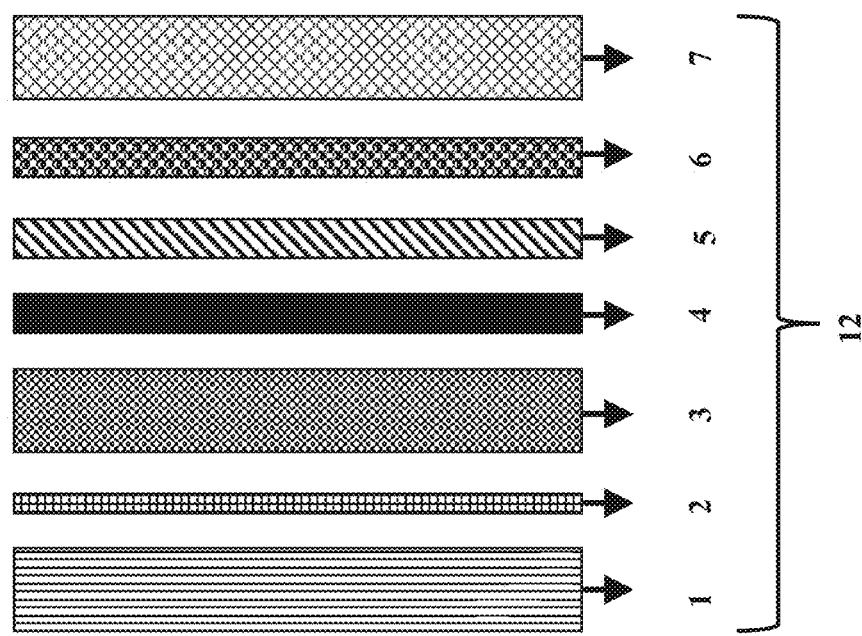

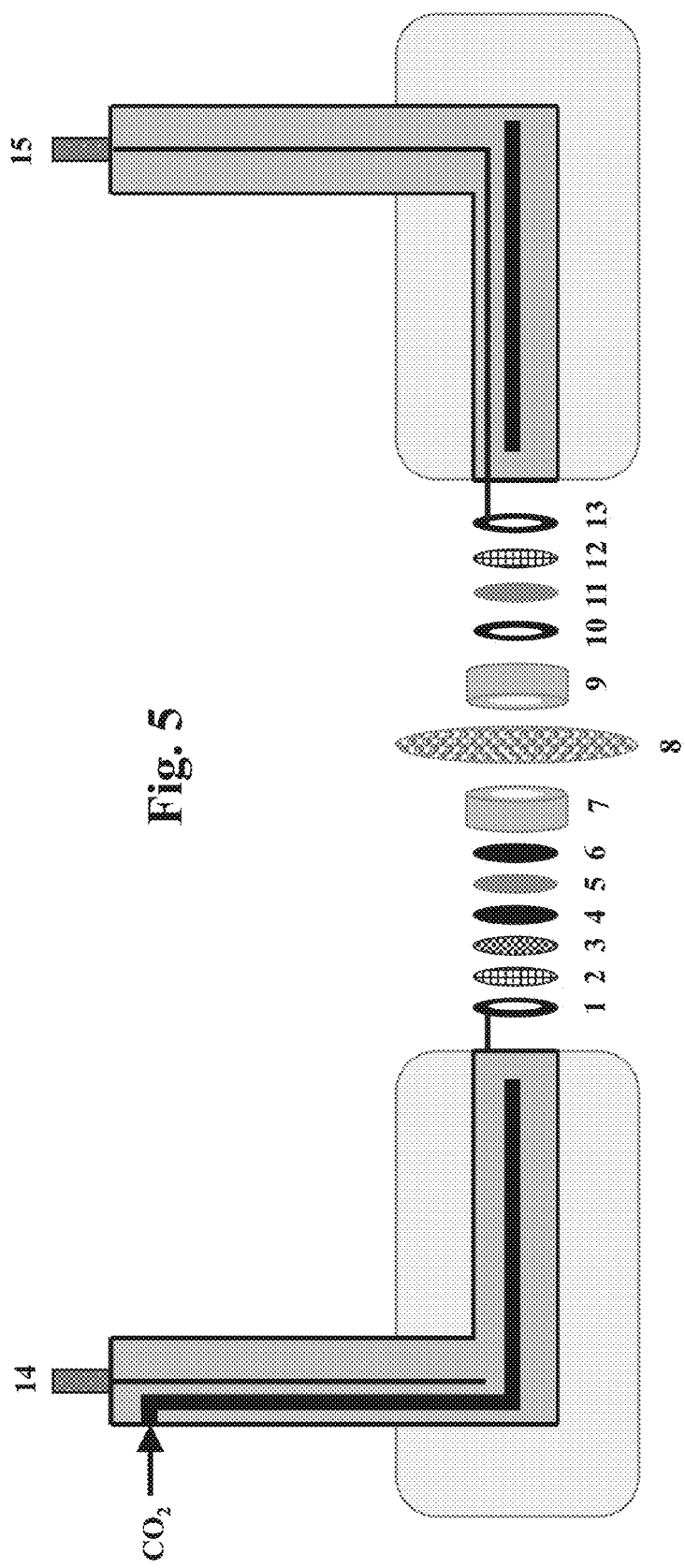

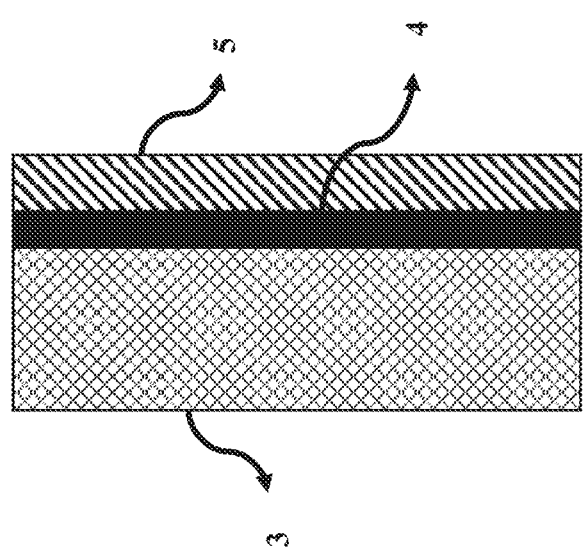

CARBON DIOXIDE REDOX FLOW BATTERY HAVING A BI-FUNCTIONAL NEGATIVE ELECTRODE

FIELD

This disclosure relates generally to carbon dioxide flow batteries, and in particular, to a negative electrode of a carbon dioxide redox flow battery that directly utilizes $CO_2$ as an active species instead of metals, and a method of manufacturing same.

BACKGROUND

Carbon capture and utilization (CCU) for the production of value-added chemicals and fuels is intensely researched by all possible catalytic pathways: thermo, bio, photo, electrocatalytic routes and combinations thereof. The electrocatalytic option is attractive due to the increasing deployment of renewable electricity sources and their decreasing cost of generation (e.g. solar and wind). However, the scale of the $CO_2$ emission problem is so enormous that it has been estimated the power-to-fuels and chemical production routes could only utilize between 1% and up to about 10% of the annual $CO_2$ emissions by 2050.

Therefore, there is a need for additional, novel $CO_2$ utilization technologies that address decarbonization. A new wave of electrochemical technologies proposed recently is focused on the utilization of $CO_2$ in primary and secondary (rechargeable) batteries. In this pathway, $CO_2$ either alone or in combination with other species (e.g. $O_2$) is an electroactive species in the battery. Thus, $CO_2$ batteries could address simultaneously and in a flexible manner the storage of intermittent renewable energy sources and the utilization of $CO_2$ captured from industrial emission sources. Proposed systems thus far, used $CO_2$ in conjunction with a metal negative electrode in metal-$CO_2$ batteries with: Li, Al, Zn, Mg or Na. The performance of these metal-$CO_2$ batteries to date is lower as compared to other metals batteries including lithium. Ion, vanadium redox flow or Zn-air.

It is therefore an object to provide a new and improved $CO_2$ battery to current metal-$CO_2$ batteries.

SUMMARY

According to one aspect of the invention, there is provided a redox flow battery comprising a negative electrode, a positive electrode and a cation exchange or bipolar membrane in between the negative and positive electrodes. The negative electrode comprises a porous base layer, a bi-functional catalyst layer for electrochemical reduction of either $CO_2$ or carbonate to formate during battery charging and for formate oxidation to either carbonate or $CO_2$ during battery discharge, and an intermediate support layer supporting the bi-functional catalyst layer and comprising a metal oxide. The metal oxide has either: a perovskite structure with the general formula $ABO_3$, wherein A is one or a mixture of La, Sr, and Ba and B is one of Co, Ti, Fe, Ni, Ga, Mg, In, Mn, Ta, or Ce; or a fluorite structure with the general formula $ABO_7$, wherein A is Nd, and B is Ir.

The bi-functional catalyst layer can comprise one or more of Pd, Sn, an intermetallic species with the formula $Pd_xSn_y$, $SnO_2$, In and Pb. The bi-functional catalyst layer can be electrodeposited or ink sprayed on the intermediate support layer. The bi-functional catalyst layer can further comprise polytetrafluoroethyelene (PTFE) and one or more carbon additives selected from a group consisting of: carbon black, graphene, and carbon nanotubes, with a PTFE to carbon additive weight ratio between 0.1:1 to 5:1.

The intermediate support layer can comprise $LaCoO_3$ electrodeposited or ink sprayed onto the porous base layer. The porous base layer can be a teflonated carbon cloth or a carbon fiber paper. The intermediate support layer can further comprise PTFE and carbon additives selected from a group consisting of: carbon black, graphite and graphene particles, with a PTFE to carbon additive weight ratio between 0.1:1 to 5:1.

The metal oxide in the intermediate support layer can comprise $LaCoO_3$ mixed with $MnO_2$. In such case, the intermediate support layer can comprise $LaNiO_3$ electrodeposited or ink sprayed on the porous base layer.

The intermediate support layer can further comprise silicon with the general formula $AxBySiO_4$, wherein A is one of Mg, Zr, and Ca, and B is one of Fe and Ni. Alternatively, the metal oxide in the intermediate support layer can comprise one of Ce, Zr, Al, and Ga.

According to another aspect of the invention, there is provided a method for electrochemically activating the negative electrode of the redox flow battery claimed in claim 1, comprising electrode potential sweeping between reduction and oxidation potentials or current pulsing between reduction and oxidation currents.

According to yet another aspect of the invention, there is provided a method for manufacturing a bi-functional negative electrode for a redox flow battery, comprising: providing a porous carbon base layer; providing a deposition mixture for an intermediate support layer comprising a metal oxide material having a perovskite structure with the formula $ABO_3$, wherein A is one or a mixture of La, Sr, and Ba and B is one of Co, Ti, Fe, Ni, Ga, Mg, In, Mn, Ta, or Ce; or a fluorite structure with the formula $ABO_7$, wherein A is Nd, and B is Ir; and, providing a deposition mixture for a bi-functional porous catalyst layer. The intermediate support layer deposition mixture is deposited onto the carbon base layer by electrodeposition or mechanical spraying, and then the catalyst layer comprising the bi-functional catalyst is deposited onto the intermediate layer by electrodeposition or mechanical spraying, creating a metal oxide supported catalyst.

BRIEF DESCRIPTION OF DRAWINGS

FIGS. 1(a)-(c) are schematic views of a non-metal $CO_2$ redox flow battery ("CRB") according to one embodiment, wherein FIG. 1(a) shows a charging cycle (energy storage) of the CRB, FIG. 1(b) shows a discharge cycle (energy generation) of the CRB and FIG. 1(c) is an exploded perspective view of a single electrochemical cell of the CRB.

FIGS. 2(a)-(e) are images and graphs for an experimental CRB having a bi-functional intermetallic PdSn catalyst electrodeposited on teflonated carbon fibre cloth, wherein FIG. 1(a) is a SEM image, FIG. 2(b) are EDX mapping images, FIG. 2(c) is a XRD spectrum, and FIGS. 2(d) and (e) are cyclic voltammograms of electrodeposited Pd (FIG. 2(d)) and PdSn (FIG. 2(e)) samples in $CO_2$ saturated 0.5 M $KHCO_3$+0.1 M $KHCO_2$ (pH of 7.4) and $N_2$ saturated 0.5 M $KHCO_3$ (pH adjusted to 7.4), with pure electrodeposited Pd (FIG. 2(d)—loading 10.7 mg $cm^{-2}$) and PdSn (FIG. 2(e)- loading 6.6 mg $cm^{-2}$).

FIGS. 3(a)-(d) are graphs of experiments showing galvanostatic polarization cycling of the CRB the negative electrode in half-cell experiments having electrodeposited PdSn bi-functional catalysts, wherein FIG. 3(a) shows a the electrode potential during galvanostatic cycling of a negative electrode composed of only teflonated carbon fiber cloth base layer and bi-functional catalyst (without the intermediate layer containing the non-PGM support), and FIG. 3(c) shows a negative electrode with a LaCoO$_3$ (loading of 0.5 mg cm$^{-2}$) intermediate layer on teflonated carbon fiber cloth acting as support for the electrodeposited PdSn catalyst. FIGS. 3(b) and (d) are cyclic voltammograms of electrodeposited PdSn catalyst in the FOR potential region after 1 hr of FOR (formate oxidation reaction) at 50 mA cm$^{-2}$ in 0.1 M KHCO$_2$+0.5 M KHCO$_3$ followed by 1 hr of CO$_2$RR (CO$_2$ reduction reaction) at −35 mA cm$^{-2}$ in CO$_2$ saturated 0.5 M KHCO$_3$.

FIGS. 4(a)-(e) are graphs of experiments showing the bi-functional performance of a CRB negative electrode in half-cell experiments comparing the binary PdSn with the ternary PdPbSn and PdInSn catalysts for CO$_2$RR and FOR, wherein FIG. 4(a) shows a galvanostatic polarization cycling on the electrodeposited PdPbSn and PdSnIn catalysts with electrochemical activation applied, FIG. 4(b) shows galvanostatic potentials for CO$_2$ electro-reduction at −20, −35 and −50 mA cm$^{-2}$ and 30 min. on activated bimetallic and ternary electrocatalyst, and FIGS. 4(c),(d) and (e) show net formate faradaic efficiency (FE) and net formate production rates on geometric electrode area and catalyst mass basis, wherein catalyst loadings are: PdSn 1.4 mg cm$^{-2}$ (FIG. 4(c)), PdPbSn 8.1 mg cm$^{-2}$ (FIG. 4(d)) and PdSnIn 3.6 mg cm$^{-2}$ (FIG. 4(e))

FIG. 5 shows a single-cell CRB configuration used for small-scale electrode screening experiments.

FIG. 10 is a schematic diagram showing a negative electrode of the CRB composed of three layers: Base transport layer (referred to also as gas-diffusion layer), non-PGM oxide intermediate layer and the bi-functional catalyst layer.

DETAILED DESCRIPTION OF EMBODIMENTS OF THE INVENTION

Embodiments described herein relate generally a redox flow battery that performs as an energy storage system and has a negative electrode that directly utilizes CO$_2$ as an active species instead of metals (herein referred to as "non-metal CO$_2$ redox flow battery" or "CRB"), a positive electrode, and a cation exchange or bipolar membrane in between the negative and positive electrodes. In some embodiments, the CRB at the negative electrode uses an electrocatalytic reduction of either CO$_2$ or carbonate to formate (HCOO$^-$) during a charge step and HCOO$^-$ electrocatalytic oxidation during a discharge step (i.e. power generation) (eq. 1 and 2). The negative electrode comprises a porous base layer, a porous bi-functional catalyst for electrochemical reduction of CO$_2$ or carbonate to formate and for formate oxidation to either carbonate or CO$_2$, and a metal oxide containing porous intermediate layer acting as a support for the bi-functional catalyst. In some embodiments, the metal oxide support is a non-Platinum group metal (PGM) oxide support, such as LaCoO$_3$, or LaNiO$_3$. In some other embodiments, the metal oxide comprises LaCoO$_3$ mixed with MnO$_2$, or LaNiO$_3$ mixed with MnO$_2$. The metal oxide support can have a perovskite structure with the general formula ABO$_3$, wherein A is one or a mixture of: La, Sr, and Ba, and B is one of: Co, Fe, Ti, Ni, Ga, Mg, In, Mn, Ta, or Ce. The metal oxide support can additionally contain silicon with the general formula AxBySiO$_4$, wherein A is one of Mg, Ca, and B is one of Fe, Ni. In some other embodiments, the metal oxide support has a fluorite structure with the general formula ABO$_7$, wherein A is Nd, and B is Ir. Furthermore, in some other embodiments, the metal oxide support additionally contains one of Ce, Al, and Ga, and for example, can be one of CeO$_2$, BaCeO$_3$, Ga doped CeO$_2$, Al$_2$O$_3$, Ag doped Al$_2$O$_3$ and Ga$_2$O$_3$.

In order to accomplish the CO$_2$/HCOO$^-$ interconversion, efficient bi-functional (or bi-directional) electrocatalysts are required to minimize the activation overpotential losses on the negative electrode during battery charge and discharge, respectively. For the positive electrode, either metallic or non-metallic redox species could be utilized. Among the latter, halide/polyhalogen redox couples (e.g., X'X2⁻, where X' and X are Br and/or I) can be used due to fast and reversible electrode kinetics on cost-effective, carbon-based electrodes. More particularly, Br⁻/Br2 can be used at the positive electrode. Complexing agents can be added (e.g., quaternary ammonium salts) to promote the formation of tri-bromide species and lower the Br2 vapor pressure.

Figure 1A:
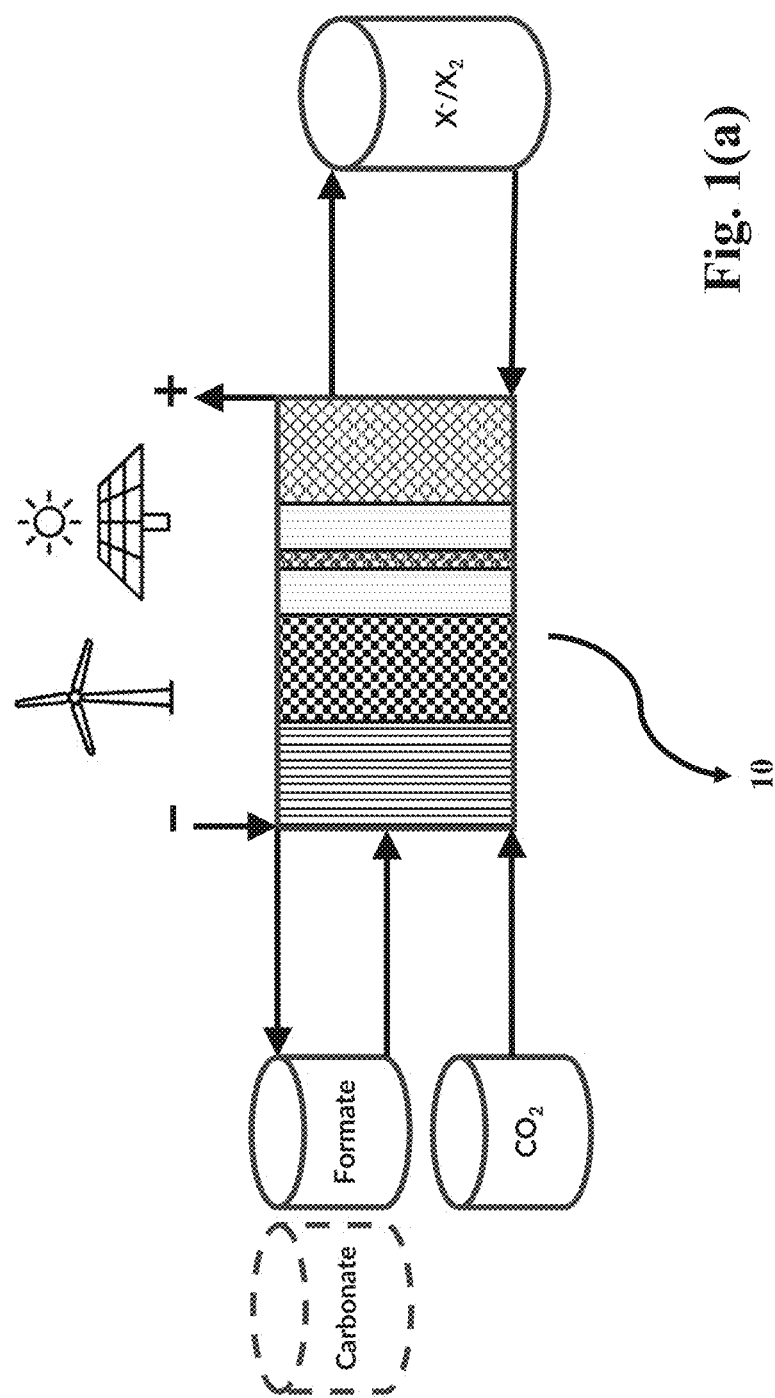
Figure 1B:
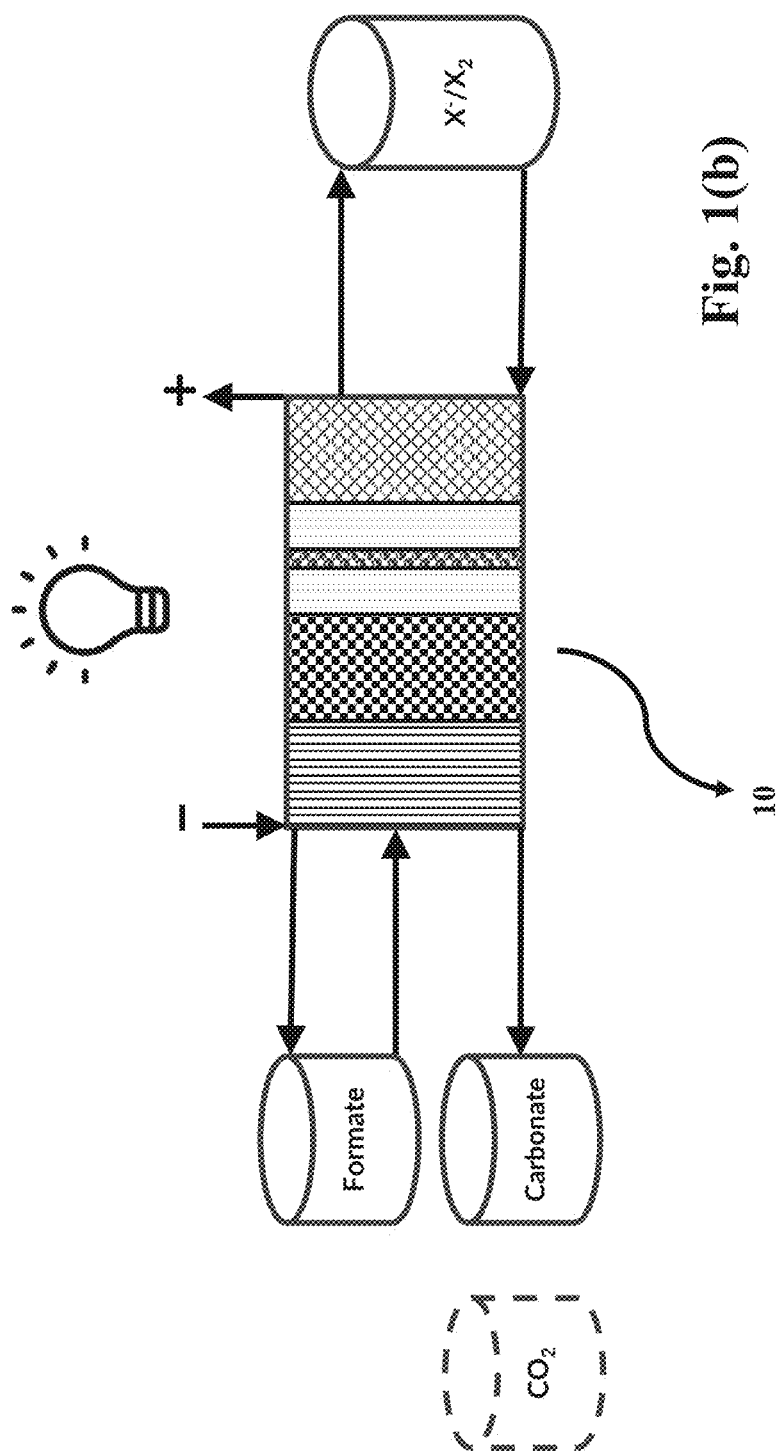

In some embodiments of the CRB, an electrocatalytically reversible $CO_2$/formate redox couple is employed at the negative electrode and a halide/poly-halide redox couple (e.g. Br⁻/Br$_3^-$ or I⁻/I$_3^-$) is employed at the positive electrode as shown in equations (1)-(3), to provide a battery charge cycle as shown in FIG. 1(a) and equation (4) and a battery discharge cycle as shown in FIG. 1(b) and equation (5):

Negative Electrode:

Under the pH conditions explored in this study (i.e., between 7 and 8) the negative electrode reactions of the rechargeable battery are:

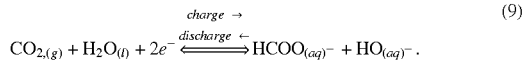

$$CO_{2(g)} + H_2O_{(l)} + 2e^- \underset{discharge \leftarrow}{\overset{charge \rightarrow}{\rightleftarrows}} HCOO_{(aq)}^- + HO_{(aq)}^-. \qquad (9)$$

According to the Nernst equation and considering ideal gas and solution, the equilibrium potential corresponding to the negative electrode according to eq. 1 is given by:

$$E_{e,T,(-)} = E_{T,(-)}^0 - \frac{RT}{2F}\ln\frac{C_{HCOO^-}}{p_{CO2}} + \frac{2.3RT}{2F}(pK_w - pH), \qquad (2)$$

where $E^0_{T,(-)}$ is the standard potential ($V_{SHE}$) for $CO_2$/ HCOO⁻ (i.e., activities for all the species equal to one) at temperature T. At 298 K and pH of 14 (i.e., OH⁻ activity approximately equal to one), and $E^0_{298,(-)}$=−0.64 $V_{SHE}$. Further in eq. 2, $C_{HCOO^-}$ is the formate molar concentration (M), $p_{CO2}$ is the $CO_{2,(g)}$ partial pressure (atm) and $pK_w$ is the water auto-ionization constant (expressed on the decimal −log scale) at temperature T and total pressure P (in the present work 1 atm). R and F are the universal gas constant and Faraday constant, respectively.

At pH=8 (typical pH condition here, see further), for 1 atm $CO_{2,(g)}$, 298 K and formate concentrations of 1 M and 0.1 M, the equilibrium potential of the negative electrode based on eq. 2 is −0.46 $V_{SHE}$ and −0.43 $V_{SHE}$, respectively.

Furthermore, it is noted that due to the well-known pH-dependent solubility of $CO_2$ and $HCO_3^-/CO_3^{2-}$ speciation, there are additional variants of operation for CRB. In one of these variants, when the CRB negative electrode is operated at a higher pH during discharge than charge (e.g., pH~14 (discharge) and pH~8 (charge step)), during discharge instead of regenerating $CO_2$ (eq. 1, which would correspond to a closed-loop carbon-neutral operation) carbonate salts can be produced as by-products of electricity generation (eq. 1a):

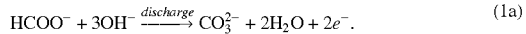

$$HCOO^- + 3OH^- \xrightarrow{discharge} CO_3^{2-} + 2H_2O + 2e^-. \qquad (1a)$$

The latter variant (referred to as the open-loop) adds a multiplier in the battery deployment by combining energy storage with $CO_2$ mineralization, therefore, the battery acting as a net $CO_2$ sink (carbon-negative operation).

FIG. 1 presents schematically the: a) charging step of the CRB, b) the discharge step coupled with carbonate generation (pH>11), and c) the basic components of an individual battery cell. The mineralization with carbonate formation variant was not further pursued here, since the negative electrode operating pH throughout was between 7 and 8 (with relevance to eq. 1).

Positive Electrode:

$$Br_{2,(l)} + 2e^- \underset{discharge \rightarrow}{\overset{charge \leftarrow}{\rightleftarrows}} 2Br_{(aq)}^- \qquad (3)$$

The equilibrium potential considering ideal solutions and molar concentrations of the species is expressed as:

$$E_{e,T,(+)} = E_{T,(+)}^0 - \frac{RT}{2F}\ln\frac{C_{Br^-}^2}{C_{Br_2}}. \qquad (4)$$

The standard potential at 298 K, $E^0_{298K,(+)}$ is equal to 1.09 $V_{SHE}$. For molar concentrations of 0.3 M $Br_2$ and 2 M Br⁻, the equilibrium potential is 1.13 $V_{SHE}$ (at 298 K).

Battery (CRB) Reactions:

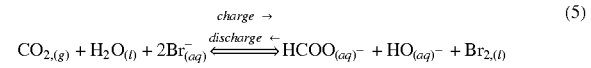

$$CO_{2,(g)} + H_2O_{(l)} + 2Br_{(aq)}^- \underset{discharge \leftarrow}{\overset{charge \rightarrow}{\rightleftarrows}} HCOO_{(aq)}^- + HO_{(aq)}^- + Br_{2,(l)} \qquad (5)$$

The discharge equilibrium cell potential can be obtained from eqns. 2 and 4:

$$E_{e,cell,T} = E_{e,T,(+)} - E_{e,T,(-)} \qquad (6)$$

At 298 K, for one exemplary set of conditions (pH 8, 1 M HCOO⁻, 1 atm $CO_2$, 0.3 M $Br_2$, 2 M Br), the battery equilibrium potential is 1.59 V. The corresponding thermodynamic (theoretical) specific energy of the CRB normalized per mass of reactants in the discharge mode (eq. 5 with K⁺ counter ion as per the present study) is 284 Wh kg⁻¹, which is over three times higher than for the vanadium redox flow battery at 89.8 Wh kg⁻¹. While it is understood that the thermodynamic specific energy has no practical implication, it shows nevertheless, the proposed battery chemistry has a high thermodynamic capability for large-scale energy storage based on the mass of reactants involved. The theoretical volumetric energy density is dependent on the solubility of potassium formate and as a result it varies: between 85.2 Wh L⁻¹$_{formate\ soln.}$ (for 1 M KHCO₂ solution) and 3,353.4 Wh L⁻¹$_{formate\ soln.}$ (for saturated 39.35 M KHCO₂ solution at 298 K).

The practical power and energy densities will be dependent on a number of complex interdependent factors related to electrodes and electrocatalysts, cell design, membrane performance (e.g., ionic conductivity, selective permeability), electrolyte composition (e.g., solubility of different species, ionic conductivity), and mass transfer (including two-phase (gas/liquid) flow during battery charge).

Embodiments described herein relate to a CRB that provides for bi-functional electrocatalysis of $CO_2$/formate interconversion such as intermetallic catalyst compositions and perovskite catalyst support, in order to decrease the activation overpotentials on the negative electrode in both reaction directions.

According to one embodiment and referring to FIGS. 1(a)-(c), a CRB 10 comprises a negative electrode with a bi-functional (i.e. bi-directional) catalyst incorporated into the catalyst layer. A suitable bi-functional catalyst can be a PdSn-based catalyst, such as activated PdSnPb. Other suitable catalysts include PdSn and PdSnIn. The catalyst is supported by a metal oxide support to enhance the overall bi-functional electrocatalytic activity of the catalysts for both bi-functional $CO_2$ or carbonate reduction ("CO2RR") and formate oxidation reaction ("FOR"), mainly by mitigating the effect of CO as a poisoning intermediate. A suitable metal oxide support is a non-Platinum group metal ("PGM") support, such as $LaCoO_3$ which is part of the intermediate layer situated between the catalyst layer and the porous base layer. In some embodiments, the catalyst and the intermediate layer contain Teflon (polytetraflurorethylene, PTFE) to impart partial hydrophobic character in order to improve the $CO_2$ gas mass transfer to the catalyst layer during battery charge and avoid liquid electrolyte flooding of the negative electrode. Furthermore, in some embodiments, both the catalyst and the intermediate layer contain carbon-based additives such as carbon black (e.g., Vulcan XC72, Ketjenblack), graphitized carbon, graphene, graphene oxide, reduced graphene oxide, carbon nanotubes alone or in a combination, in order to increase the electronic conductivity of the oxide based intermediate layer, enhance the utilization of the catalyst layer and contribute to mass transfer enhancement toward and from the catalyst layer during battery charge and discharge. In some embodiments, the catalyst layer and/or the intermediate support layer can have a composition comprising PTFE and one or more carbon additives such as carbon black, graphene, and carbon nanotubes, having a PTFE to carbon additive weight ratio between 0.1:1 to 5:1

A CRB 10 equipped with an activated $LaCoO_3$-supported PdSn electrode is expected to provide superior performance compared to other emerging battery technologies such as S-air and $CO_2/CH_4$—Zn batteries. Suitable metal oxide supports include: oxide supports with perovskite structure with the general formula: $ABO_3$, wherein A is one of: La, Sr, and Ba, and B is one of: Co, Ti, Ni, Ga, Mg, In, Mn, Fe, Ta and Ce; and oxide support with a fluorite structure with the general formula $ABO_7$, wherein A is Nd, and B is Ir. In addition to the perovskite or fluorite structure oxides, the intermediate support layer can contain silicon with the general formula $A_xB_ySiO_4$, where A is one of Mg, Ca, and B is one of Fe, Ni; cerium such as $CeO_2$, $BaCeO_3$, Ga doped $CeO_2$; and aluminum such as $Al_2O_3$ and Ag doped $Al_2O_3$; and gallium such as $Ga_2O_3$.

As can be seen in FIG. 1(c), the CRB 10 is composed of electrochemical cell components including a negative electrode assembly 12 comprising a gas flow channel 1, an embedded current collector 2, a porous transport base layer referred to also as a gas-diffusion layer (GDL) 3, an intermediate support layer 4, and a bi-functional catalyst layer 5. The CRB 10 also includes a cation exchange or bipolar membrane 6, and a positive electrode 7 comprising porous carbon (or graphite).

In some embodiments, the current collector 2 can be a stainless steel or titanium mesh, the porous base layer 3 can be a teflonated (i.e., PTFE treated) carbon fiber paper such as Freudenberg H23C7 or carbon cloth, which acts as a gas diffusion and mass transport layer, the intermediate support layer 4 can be a sprayed or electrodeposited layer containing the non-PGM oxide support mixed with carbon and PTFE, and the catalyst layer 5 can be a sprayed or electrodeposited layer containing the bi-functional catalyst such as but not limited to PdSn, carbon and Teflon additives. For example, the intermediate support layer 4 can comprise $LaNiO_3$ electrodeposited or ink sprayed on the porous base layer 3. The base layer (or GDL) 3 together with the intermediate support layer 4 and catalyst layer 5 serve as a gas diffusion negative electrode (GDE). In some embodiments, the positive electrode 7 can be a PTFE-treated carbon fiber layer in 0.3 M $Br_2$+2 M KBr (posolyte). The cation exchange membrane 6 can be selected from commercially available cation exchange membranes, such as Nafion 115.

According to some embodiments, the gas diffusion negative electrode of the CRB 10 can be manufactured as follows: a PTFE-treated carbon fiber cloth (e.g., 40% wt. PTFE) can be used as the base layer for electrode preparation. A nitric acid ($HNO_3$) pre-treatment is performed on the carbon fiber base layer to increase its surface roughness and wettability before the electrodeposition of the bi-functional catalyst layer. The concentration of the $HNO_3$ solution, pre-treatment temperature and duration will have a synergistic effect on the resultant properties of the base layer impacting the subsequent spraying or electrodeposition steps. Next, the intermediate layer is sprayed onto the base layer using a spray ink comprising of (but not limited to); non-PGM oxide, carbon-based additive and PTFE with a typical weight ratio of 1:1:1. Spraying of the intermediate layer can be carried out in one single step followed by drying or multiple sequential spraying steps with drying stages in between. Typical loading of the non-PGM oxide is between 0.1 to 2 mg cm$^{-2}$. Following the intermediate layer application, an electrodeposition bath is prepared containing (but not limited to) the precursor chemicals for the bi-functional catalyst material. Diverse electrodeposition techniques can be used to deposit the bi-functional catalyst layer onto the intermediate support layer, such as cyclic voltammetry, constant current or pulsed current electrodeposition, constant potential or pulsed potential deposition or combinations thereof. Other embodiments of the gas diffusion negative electrode manufacturing could include electrodeposition of the non-PGM oxide intermediate layer and/or spraying of the catalyst layer using an ink containing the bi-functional catalyst material, carbon and PTFE additives Experimental Tests The following experiments demonstrate that a metal-free $CO_2$ redox flow battery as a single unit can perform as an energy storage system with direct $CO_2$ utilization.

Preparation of Catalysts and Gas Diffusion Electrodes (GDE)

A 40 wt % PTFE-treated carbon fiber cloth from Fuel Cell Earth was used as the substrate for the negative electrode preparation. The substrate was subjected to a $HNO_3$ solution pre-treatment to increase the surface roughness and wettability before the electrodeposition step. The electrodeposition baths were composed of various combinations and concentrations of palladium (II) chloride ($PdCl_2$, Sigma-Aldrich, 99%) (0-40 mM), tin (II) chloride ($SnCl_2$, Sigma-Aldrich, 98%) (0-40 mM), lead (II) acetate tri-hydrate ($Pb(CH_3CO_2)_2 \cdot 3H_2O$, Sigma-Aldrich, ≥99%) (0-20 mM), Indium (III) sulfate ($In_2(SO_4)_3$, Sigma-Aldrich, ≥98.0%) (0-20 mM), hydrochloric acid (HCl, Sigma-Aldrich, 37%) and Triton X-100 (EMD Millipore Corporation). Using a three-electrode electrochemical setup, a wide range of catalysts including: Pd, Sn, PdSn, PdSnPb and PdSnIn, were electrodeposited on the carbon substrate by a cyclic voltammetry technique applied for 50 cycles between −0.3 and 1 $V_{Ag/AgCl}$ at 0.02 V s$^{-1}$ followed by pulsed potentiostatic deposition for 6 cycles at −1 $V_{Ag/AgCl}$ (4 min) with break at open-circuit potential (1 min) during each cycle. The reference and counter electrodes were Ag/AgCl with saturated KCl ($E_{e,298K}$=0.199 $V_{SHE}$, Cole-Parmer) and perforated platinized titanium plate, respectively. Following the electrodeposition procedure, the samples were cleaned with isopropyl alcohol at 343 K for 15 min to wash off any surfactant residues from the electrodeposited layer.

For the oxide supported catalyst samples, non-Platinum Group Metal (non-PGM) oxides, $MnO_2$ (Sigma-Aldrich), $LaCoO_3$ (synthesized via co-precipitation method) or $MnO_2$—$LaCoO_3$ (1:1 weight ratio), were sprayed as an ink mixture with Vulcan XC-72R prior to the electrodeposition procedure on the pretreated carbon fiber cloth.

Surface and Crystallographic Characterization of the Catalysts

A field emission scanning electron microscopy (FESEM, Hitachi S-4700) equipped with an energy dispersive X-ray (EDX) gun was employed to perform EDX mapping, elemental analysis and morphological observations of the electrodeposited catalysts. X-ray diffraction (XRD, Rigaku MultiFlex) was employed to analyze the crystallographic structures of the electrodeposited catalysts (XRD conditions: generator set at 40 kV and 40 mA; Cu as X-ray source; wavelength of 1.541874 Å $K_{\alpha 1}$; scan rate 1° (2θ) per minute).

Formate Analysis

The formate concentration in the solutions was analyzed using both spectrophotometric and ion chromatography methods. The net formate faradaic efficiency and net formate production rates presented in this work are cumulative for each data point during the experiments.

Half-Cell Setup for Electrocatalysis Studies

A flooded-cell setup was employed to test the electrocatalytic activity of electrodeposited catalysts for both $CO_2$ reduction ($CO_2$RR) and formate oxidation (FOR) reactions. A conventional three-electrode cell configuration was used with the catalyst deposited electrode fitted into a rotating disk electrode (RDE) set up as a working electrode (geometric area=0.28 $cm^2$), Ag/AgCl KCl saturated reference electrode and a spiral platinum wire as a counter electrode. A range of electrochemical tests were performed including cyclic voltammetry (CV), chronopotentiometry (CP) and galvanostatic cycling. A divided cell with the positive electrode compartment separated by a Nafion 115 membrane from the working (i.e., negative) electrode was used to measure the net formate faradaic efficiency for the catalysts in a flooded-cell setup. All electrode potentials are reported versus the Ag/AgCl KCl saturated reference electrode unless otherwise specified or labeled.

Preliminary Battery Cell Design

The batch-type battery tests were performed in a divided cell with two L-shaped electrode holders protruding toward the membrane on each side in order to decrease the distance between negative and positive electrodes, hence, lower the cell resistance. On the negative electrode side, $CO_2$ gas was purged at the back of the bi-functional GDE (geometric area=1.33 $cm^2$) through the L-shaped holder at a flow rate of $3.17 \times 10^{-3}$ standard liter $min^{-1}$ (SLM) at 1 atm pressure. The negolyte was either 2 M $KHCO_3$ (for state-of-charge tests) or 2 M $KHCO_3$+1 M $KHCO_2$ (for charge-discharge polarization and galvanostatic cycling tests) facing the GDE. The negative electrode assembly included a stainless steel mesh as a current collector, two Freudenberg H23C7 teflonated carbon papers (thickness 250 μm each) acting as gas flow distributor. The GDE prepared as described previously was pressed against the gas flow distributor on one side and faced the negolyte solution on the other side. The GDE contained either two or three layers, whether the catalyst is unsupported or supported, respectively: 1) a 40 wt % PTFE-treated carbon fiber cloth (from Fuel Cell Earth, thickness 380 μm) as the backing/substrate layer, 2) a sprayed layer of Vulcan XC-72R and a non-PGM oxide powder (i.e., $MnO_2$, or $LaCoO_3$ or $MnO_2$—$LaCoO_3$ with the loading of 0.5 mg $cm^{-2}$ each) at a weight ratio of 1:1 acting as the catalyst support layer, and 3) the electrodeposited PdSn or PdSnPb catalyst layer. The electrodeposition procedure was previously described in the GDE preparation section.

A 40 wt % PTFE-treated carbon fiber cloth (from Fuel Cell Earth) was used as a positive electrode (geometric area=1.33 $cm^2$) in 0.3 M $Br_2$+2 M KBr (posolyte) to complete the battery cell. A cation exchange membrane (Nafion® 115) was employed to transport $K^+$ from the positive to the negative electrode compartment during battery charge and in the opposite direction during discharge. In the CRB, it is essential that the cation exchange membrane minimizes any anion anion crossover (including bromide and formate), hence, no anion exchange membrane can work for this system. The membrane was treated for 1 hr in 5 wt % $H_2O_2$ at 343 K followed by 20 min in DI water at 298 K, 1 hr in 0.5 M $H_2SO_4$ at 343 K, 20 min in DI water at 298 K and 1 hr in 0.5 M KOH at 313 K prior to the experiments. The battery polarization tests were run at 0.1 mA $s^{-1}$ starting with the discharge polarization cycle followed by a 15 min. long open circuit potential (OCP) measurement and followed by the charge polarization cycle. The galvanostatic cycling experiments in the battery setup were performed at 0.5 mA $cm^{-2}$.

(a) Synthesis, Characterization and Bi-Functional $CO_2$ Reduction ($CO_2$RR) and Formate Oxidation Reaction (FOR) Electrocatalytic Activities of PdSn Catalysts Referring to FIGS. 2(a)-(d), catalyst formulations for the battery negative electrodes were based on PdSn due to the well-established individual activities of Sn for $CO_2$RR and Pd for FOR, respectively. Therefore, it was of interest to investigate whether the combination of these two elements could provide the necessary bi-functional performance. PdSn catalysts were prepared by electrodeposition onto a teflonated (40 wt %) carbon fiber cloth according to the procedure described above. Structural characterization reveals the formation of spherical deposits with a dual structure, composed of larger spherical aggregates (~1 μm diameter) decorated with a network of nanoparticles (~10-100 nm diameter) (FIG. 2(a)). The EDX mapping shows a homogeneous distribution of Pd and Sn with a 2:1 atomic ratio throughout the deposited structures (see FIG. 2(b)). Moreover, XRD analysis reveals a variety of intermetallic compositions including PdSn, $PdSn_2$, $PdSn_3$, $Pd_{0.83}Sn_{0.17}$, as well as the presence of individual (unalloyed) Pd, Sn and $SnO_2$ (see FIG. 2(c)).

The cyclic voltammetry behavior of pure Pd and the electrodeposited PdSn were compared in the absence and presence of $CO_2$. Referring to FIG. 2(d), cyclic voltammograms are shown of Pd (left) and PdSn (right) samples in $CO_2$ saturated 0.5 M $KHCO_3$+0.1 M $KHCO_2$ (pH of 7.4) and $N_2$ saturated 0.5 M $KHCO_3$ (pH adjusted to 7.4), with catalyst loadings of Pd at 10.7 mg $cm^{-2}$ and PdSn at 6.6 mg $cm^{-2}$, 10 Cycles, 293 K., 2000 rpm. In the formate-free $N_2$ saturated electrolyte, the cyclic voltammogram of a reference pure Pd electrodeposited sample presents an anodic wave for oxide formation (around 0.75 V), a reduction peak on the cathodic sweep at −0.14 V for $PdO_x$ reduction and another reduction peak at −1.2V due to hydrogen adsorption followed by the hydrogen gas evolution reaction (HER) at more negative potentials (FIG. 2(d)). The addition of 0.1 M formate to the electrolyte generated two characteristic formate oxidation waves; one on the forward anodic sweep (peak potential 0.9 V) and the other one with higher oxidation peak current density on the reverse cathodic sweep. The latter wave (peak potential at 0.5 V) is characteristic for the direct two-electron formate oxidation on the CO-free and partially oxidized surface (see FIG. 2(d)). In the $CO_2$ saturated electrolyte, the reduction currents are in the potential domain where $CO_2$RR is expected to occur at high rate (i.e., potential lower than −1.2 V vs. Ag/AgCl, KClstd.) are similar to those in the $N_2$ saturated electrolyte at the same pH (7.4). This finding suggests that pure Pd is not a bi-functional catalyst and in the latter potential range only HER takes place. Based on literature, Pd surfaces were shown to have only minor activity for $CO_2$RR to CO and $CH_x$ at high cathodic overpotentials, therefore, it is clear pure Pd is not a suitable catalyst for the CRB.

Figure 2A:
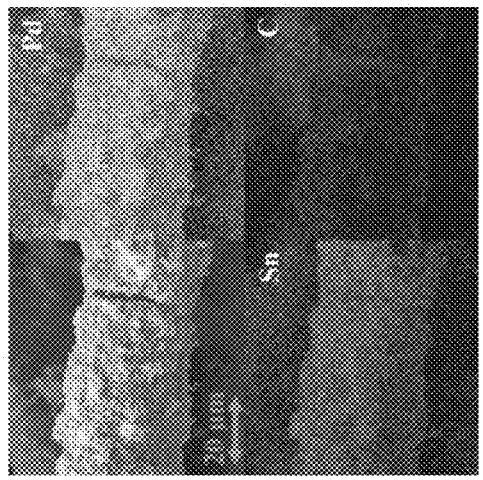
Figure 2B:
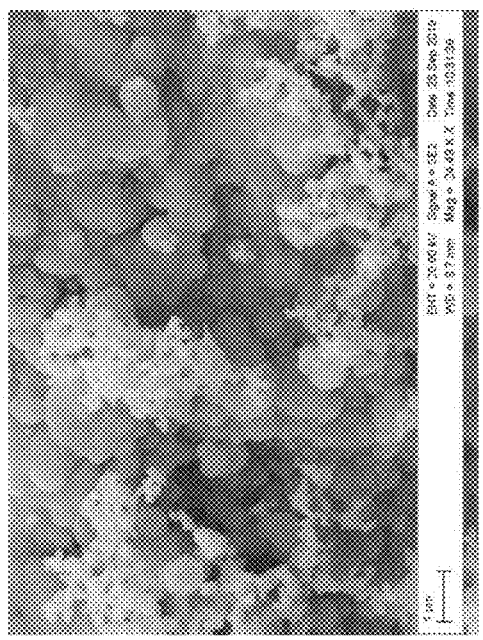
Figure 2C:
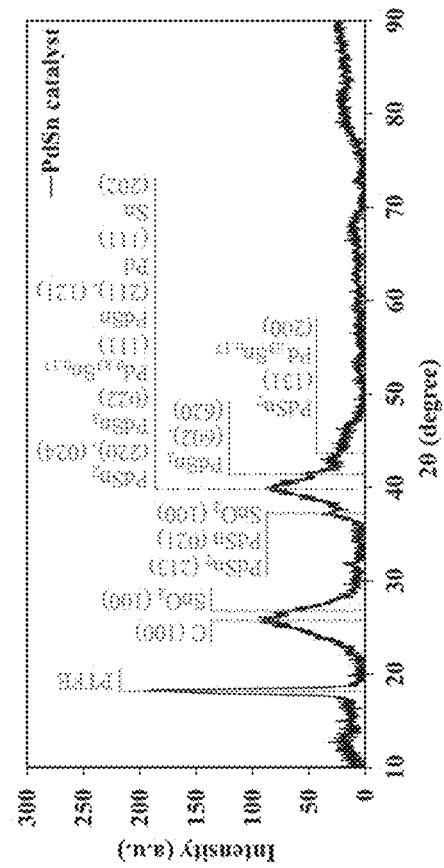
Figure 2E:
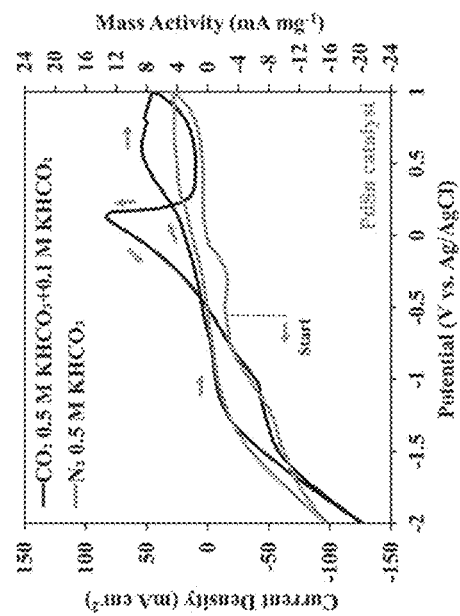
Figure 2D:
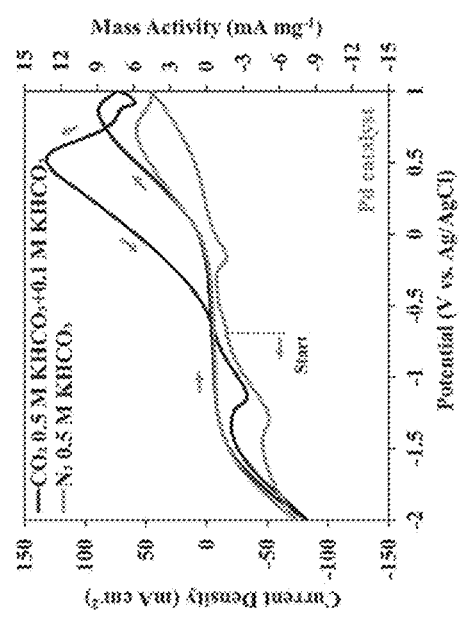

In contrast, the intermetallic PdSn catalyst shows higher cathodic current densities in the presence of $CO_2$ compared to $N_2$ at potentials lower than −1.6 V (FIG. 2(e)) due to Sn and its well-known activity for $CO_2$RR to formate. PdSn is also active for FOR with the corresponding FOR peak potential on the cathodic scan approximately 0.35 V lower on PdSn compared to pure Pd (FIG. 2e vs. 2d). This indicates that in the case of PdSn the unoxidized surface is the most active for FOR catalysis. The anodic passivation of Sn forming $SnO_x$ at high potentials (>0.7 V vs. Ag/AgCl KClstd.), renders the surface less active for FOR. The $SnO_x$ layer on the other hand, can play a major beneficial role for $CO_2$RR to formate. Thus, in the case of bi-functional catalysis, there is a strong interdependency between the two different potential domains of operation with respect to the state of the catalyst surface. On a mass activity basis, the FOR peak current per catalyst mass on the cathodic scan is virtually identical for PdSn and Pd (FIGS. 2(d) and (e)), indicating that the presence of Sn does not hinder the FOR.

Overall, based on cyclic voltammetry experiments the PdSn catalyst demonstrated bi-functional electrocatalytic activity for $CO_2$RR and FOR in the same electrolyte and pH (FIG. 2(e)). Further validation is presented in the next sections.

Figure 3A:
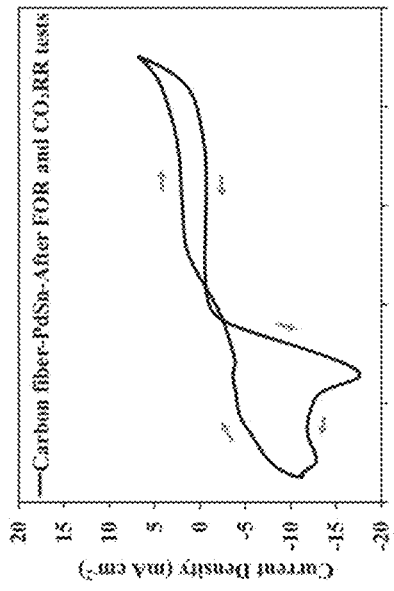
Figure 3B:
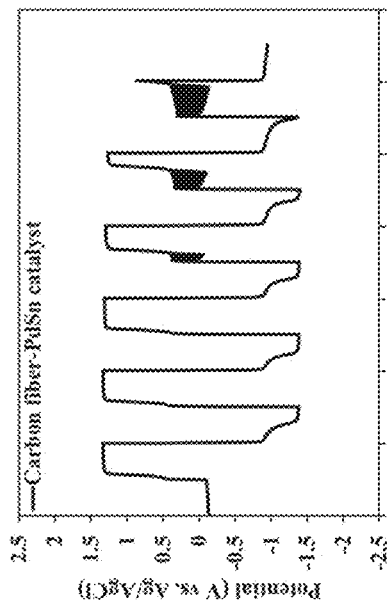

(b) $CO_2$RR and FOR Cycling Durability and Non-Platinum Group Metal (Non-PGM) Oxide Supports for PdSn Catalyst Referring to FIGS. 3(a) to (d), the effect of non-PGM supports on the electrocatalytic activity of bi-functional PdSn catalysts were tested, wherein: FIG. 3(a) involves galvanostatic polarization cycling between $CO_2$RR and FOR of electrodeposited PdSn catalysts, FIG. 3(b) involves only teflonated carbon fiber cloth (no non-PGM support), and FIG. 3(c) involves a $LaCoO_3$ support (loading of 0.5 mg $cm^{-2}$) on teflonated carbon fiber cloth. The sequence started with 5 min. of OCP measurement, followed by FOR at 50 mA $cm^{-2}$ and then $CO_2$RR at −35 mA $cm^{-2}$, each for 5 min., with FOR—$CO_2$RR cycle repeating for 6 times in $CO_2$ saturated 0.1 M $KHCO_2$+0.5 M $KHCO_3$. FIGS. 3(b) and (c) show cyclic voltammograms of PdSn catalyst in the FOR potential region after 1 hr of FOR—OCP at 50 mA $cm^{-2}$ in 0.1 M $KHCO_2$+0.5 M $KHCO_3$ followed by 1 hr of $CO_2$RR at −35 mA $cm^{-2}$ in $CO_2$ saturated 0.5 M $KHCO_3$. FIG. 3(e) are representative cyclic voltammograms of wide potential range electrochemical activation applied to the PdSn with $LaCoO_3$ support consisting of 50 cycles in $N_2$ saturated 0.5 M $KHCO_3$ starting from −2 V to 1.1 V at 0.02 V $s^1$. FIG. 3(f) shows galvanostatic polarization cycling of the activated $LaCoO_3$ supported-PdSn catalyst with the FOR—$CO_2$RR tests repeating for 18 cycles, with a PdSn loading:2.7 mg $cm^{-2}$, at 293 K and 2000 rpm.

Cycling durability between $CO_2$RR and FOR is an essential requirement for the negative electrode catalyst of the CRB. Galvanostatic polarization cycling between −35 and +50 mA $cm^{-2}$ of the intermetallic PdSn catalyst electrodeposited on teflonated carbon fiber cloth, presented and characterized in the previous section, shows potential oscillations during FOR after only three cycles (FIG. 3a). These oscillations trigger a corresponding dramatic loss of FOR activity as shown by the complete absence of the formate oxidation wave and peak in the cyclic voltammogram following the one-hour galvanostatic cycling protocol (FIG. 3b). It is important to note that the FOR oscillations also occur when the galvanostatic polarization cycling does not extend to the $CO_2$RR potential region. Hence, it is exclusively related to FOR. Deactivation of FOR with cycling is likely caused by poisoning adsorbates such as $CO_{ad}$ formed through the indirect FOR pathway, and possibly assisted by $OH^-$. The $CO_2$RR activity, on the other hand, is stabilized after five cycles at a potential of approximately −0.95 V (FIG. 3(a)).

To overcome the FOR deactivation and enhance the bi-functional durability of the intermetallic PdSn catalysts, we investigated non-PGM oxides, i.e., $LaCoO_3$, $MnO_2$, $MnO_2$—$LaCoO_3$ as an intermediate layer between the porous teflonated carbon substrate base layer and the catalyst layer. The non-PGM oxides alone or in combination have no electrocatalytic activity on their own toward FOR and poor activity for $CO_2$RR compared to PdSn. Thus, these oxides act mainly as catalyst supports.

Cyclic voltammograms show that the non-PGM oxide supports have virtually no effect on the $CO_2$RR behavior of PdSn compared to the teflonated carbon fiber cloth substrate but they have a strong impact on FOR. Furthermore, cyclic galvanostatic polarization experiments reveal superior $CO_2$RR and FOR electrocatalytic activities and FOR stability for the $LaCoO_3$-supported PdSn, as shown by the elimination of potential oscillations and deactivation in the FOR region (compare FIG. 3(c) with 3(a) and FIG. 3(d) with 3(b)). Among the investigated oxide supports, while $MnO_2$ eliminated the FOR oscillations as well, $LaCoO_3$ showed overall better performance. Based on literature analysis, it is proposed that the $LaCoO_3$ support effect could be due to the ability of the perovskite structure to adsorb and convert $CO_{ad}$, a poisoning intermediate formed during FOR, via a heterogeneous catalytic reaction Thus, CO adsorbs on and reacts with the perovskite lattice oxygen (i.e., $O^{2-}$ ions) or weakly-bonded adsorbed oxygen to form $CO_2$ which is desorbed from the surface leaving behind a $CO_{ad}$-free surface on the $LaCoO_3$ support. In this mechanism, therefore, it is proposed that the perovskite support provides active sites for $CO_{ad}$ and oxidation to $CO_2$. It is further hypothesized that there could be an intermingling between the metallic catalyst and support atoms (i.e., Pd and La, respectively) such that $CO_{ad}$ formed on the catalyst sites can easily surface diffuse to the perovskite lattice oxygen sites.

Next, further gains in bi-functional catalytic activity can be obtained by carrying out a wide potential range electrochemical activation of the PdSn catalysts. The activation protocol consisted of fifty cycles from −2 V to 1.1 V at 0.02 V $s^{-1}$ in $N_2$ saturated 0.5 M $KHCO_3$ solution (FIG. 3(e)). As a result of the activation cycles, distinguished oxidation and reduction peaks appear in the PdSn voltammograms corresponding to Sn oxidation (around −0.41 V) and oxide reduction (around −0.43 V), respectively, with a minor peak for Pd oxidation (starting at 0.32 V). The shifts in the location of these oxidation and reduction peaks have been associated with successive formation and reduction of Pd/Sn oxides with complex composition. Moreover, the surface oxidation/reduction cycles (particularly with regard to $SnO_x/$Sn) carried out during the electrochemical activation of PdSn, generate more negative current densities at potentials lower than −1 V due to the formation of nascent metallic Sn surface with higher surface area and increased HER activity (FIG. 3(e), compare cycle 1 and 50).

Figure 3C:
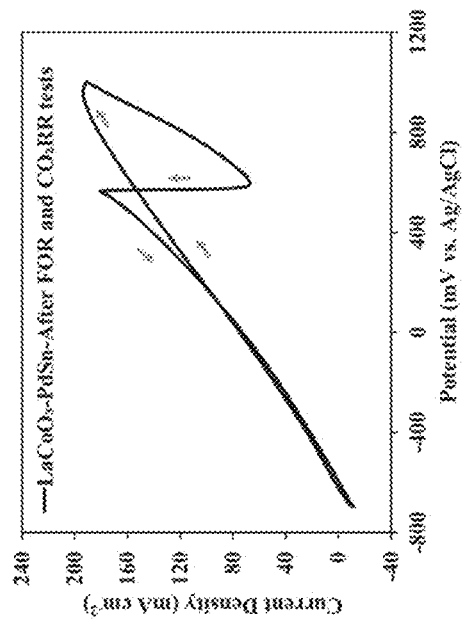
Figure 3D:
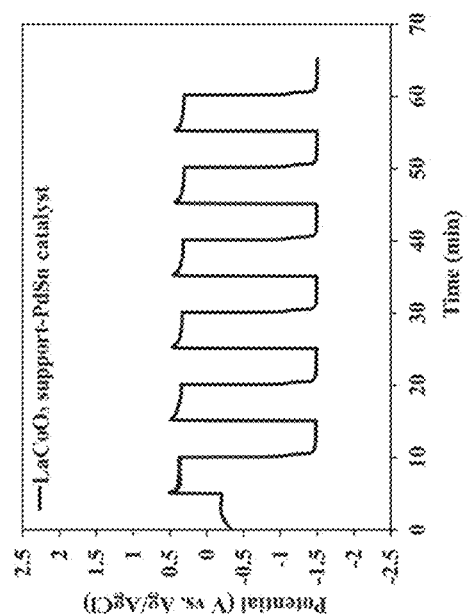
Figure 3E:
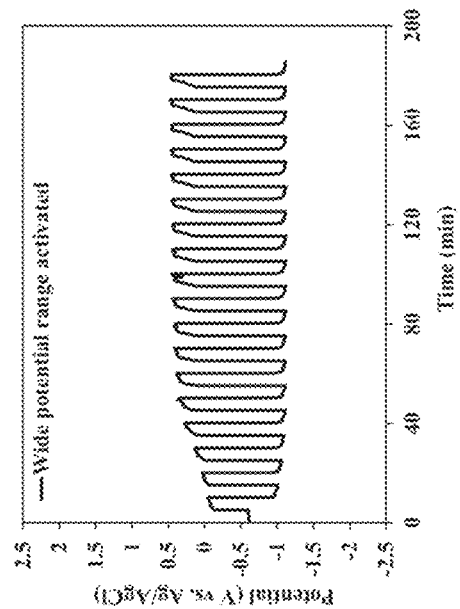
FIG. 3(e) is a cyclic voltammogram of wide potential range electrochemical activation test of the negative electrode with PdSn catalyst and LaCoO$_3$ support consisting of 50 cycles in N$_2$ saturated 0.5 M KHCO$_3$ starting from −2000 mV to 1100 mV at 20 mV s$^{-1}$.
Figure 3F:
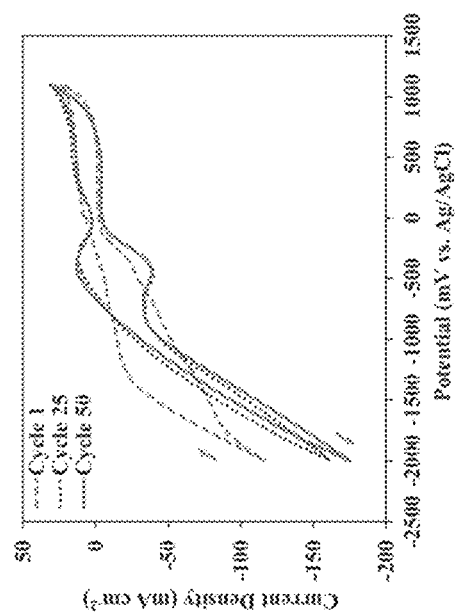
FIG. 3(f) shows a galvanostatic polarization cycling of the negative electrode with activated LaCoO$_3$ support-PdSn catalyst with the FOR—CO$_2$RR tests repeating for 18 cycles.

Comparing the galvanostatic cycling results of the unactivated (FIG. 3(c)) and activated (FIG. 3(f)) $LaCoO_3$ supported PdSn, the electrochemical activation enhances both the $CO_2RR$ and FOR performance as shown by the smaller potential difference between the FOR and $CO_2RR$ potentials. However, after the first three cycles, the effect is more pronounced for $CO_2RR$, in which case up to 0.5 V decrease in (absolute) value of $CO_2RR$ potentials is observed at −35 mA $cm^{-2}$ (compare FIGS. 3f and 3c). Moreover, the activated and perovskite supported catalyst shows a very stable behavior during 3 hrs. of galvanostatic cycling (FIG. 3f). The enhanced electrocatalytic activity and durability of activated PdSn catalysts are likely due to the formation of mixed-oxides such as $SnO_x/Sn$ during the wide potential range electrochemical activation characterized by high surface area and enhanced electrocatalytic activity toward $CO_2RR$ to formate in mild alkaline media.

Figure 4B:
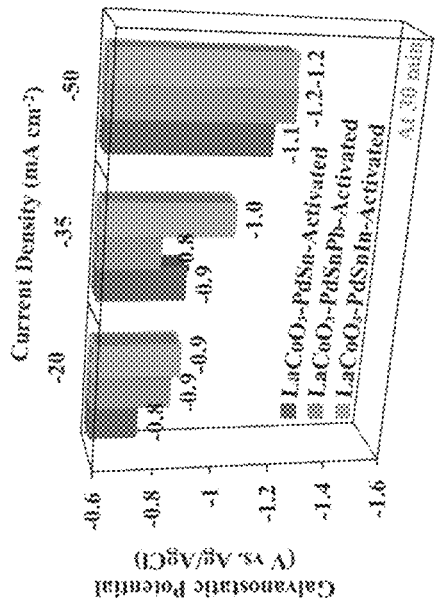
Figure 4D:
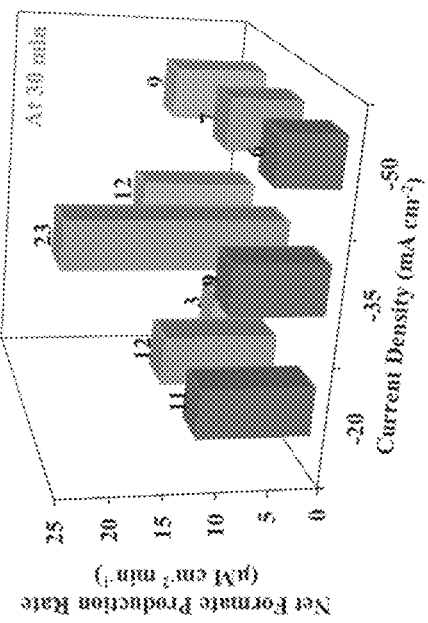
Figure 4A:
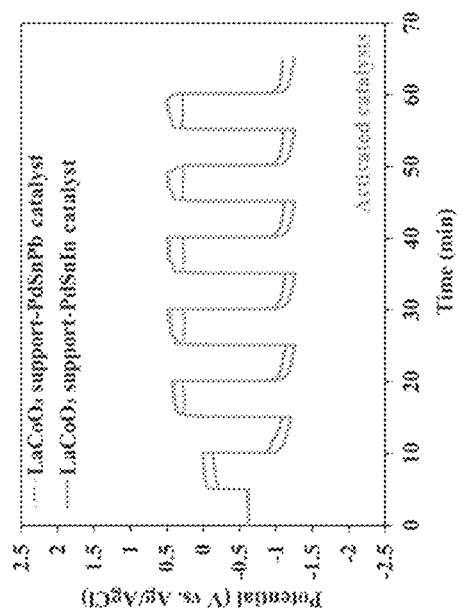
Figure 4C:
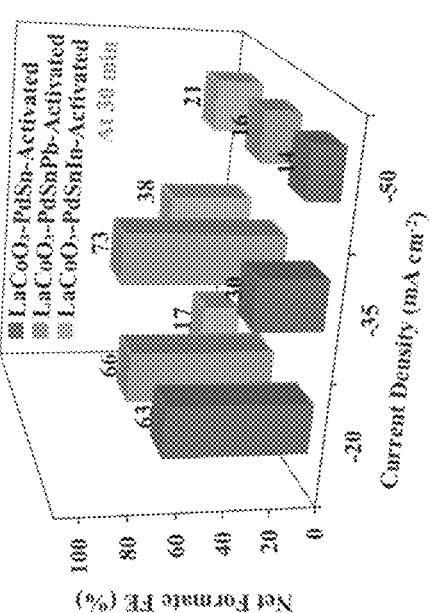
Figure 4E:
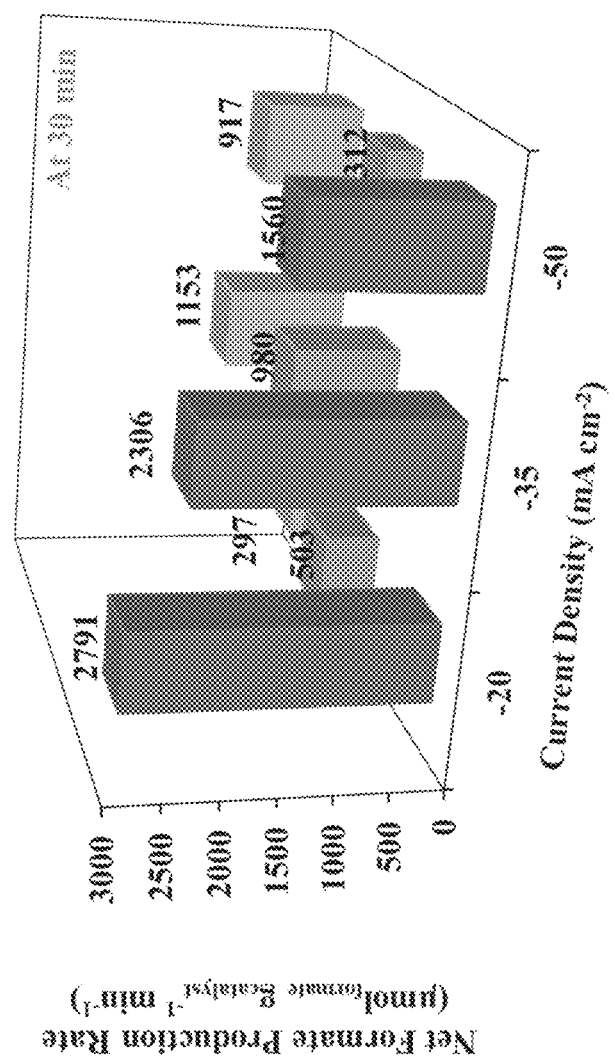

(c) Ternary Electrocatalyst Formulations for $CO_2RR$—FOR Bi-Functional Activity Referring to FIGS. 4(a) to (d), bi-functional performance between binary and ternary catalysts were tested, wherein FIG. 4(a) shows galvanostatic polarization cycling of the $LaCoO_3$ supported PdPbSn and PdSnIn catalysts with electrochemical activation applied; FIG. 4(b) shows galvanostatic potentials for $CO_2$ electro-reduction at superficial current densities of −20, −35 and −50 mA $cm^{-2}$ on activated bimetallic and ternary electrocatalyst (time 30 min.); and FIGS. 4(c) to (e) show formate production faradaic efficiency (FE) and net formate production rates on geometric electrode ara and catalyst mass basis respectively. The catalyst loadings: PdSn 1.4 mg $cm^{-2}$, PdPbSn 8.1 mg $cm^{-2}$ and PdSnIn at 3.6 mg $cm^{-2}$. All other conditions idem to those provided above for the tests shown in FIG. 3.

Further bi-functional catalyst development focused on ternary formulations containing In and Pb in addition to PdSn. Both Pb and In were chosen for co-electrodeposition along with Pd and Sn mainly due to their electrocatalytic activity for $CO_2$ reduction to formate. The morphology of the ternary catalysts is composed of compact spherical aggregates (less than 2 μm), with uniform distribution of all three elements as shown by EDX mapping. In terms of elemental composition, the Pd:Sn:Pb atomic ratio was 1:1.2:0.1, while Pd:Sn:In atomic ratio was 1:0.32:0.07. The XRD spectra show that PdPbSn has a crystalline structure containing a combination of intermetallics such as $PdSn_2$, $Pb_9Pd_{13}$, $Pd_3Sn$ as well as Pd, Sn and Pb alone (FIG. S9b). In contrast, PdSnIn has an amorphous structure.

FIG. 4 compares the bi-functional electrochemical performance of the ternary catalysts (PdSnPb, PdSnIn) with $LaCoO_3$ intermediate support layer and electrochemical activation applied (as described in the previous section). The galvanostatic cycling profiles, electrode potentials, net formate production rates and formate Faradaic efficiencies are shown as a function of superficial current density. Ideally, such a comparison should take into account the electrocatalytically active surface area (ECSA). The real current density (i.e., normalized per ECSA) is the best indicator of the intrinsic catalytic activity for different catalyst compositions. Determining the ECSA for PdSnPb, PdSnIn and PdSn is not trivial since these surfaces do not respond well to commonly used methods such as underpotential hydrogen deposition or $CO_{ad}$ stripping. In light of these observations, the comparisons presented in FIG. 4 must be considered on a relative basis, not necessarily an absolute reflection of the intrinsic, catalyst-composition-dependent, activity.

Among the catalysts investigated, the galvanostatic polarization cycling tests (compare FIGS. 3(f) and 4(a)) reveal that at the same superficial current densities, the activated-PdPbSn/$LaCoO_3$ is slightly better performing than both activated-PdSn/$LaCoO_3$ and activated-PdSnIn/$LaCoO_3$. For the PdPbSn, the $CO_2RR$ and FOR potentials are −1.1 V (at −35 mA $cm^{-2}$, 65 min.) and 0.28 V (at 50 mA $cm^{-2}$, 60 min.), respectively.

Chronopotentiometry tests in a batch-divided cell setup corroborate the galvanostatic cycling results in that the $LaCoO_3$ intermediate layer supported and activated PdSnPb and PdSn provide the highest $CO_2$-to-formate faradaic efficiencies (FEs) and lowest (in absolute value) $CO_2RR$ potentials at a constant current density (FIGS. 4b and c). The highest FEs were between 66% and 73% (at −20 and −35 mA $cm^{-2}$) for the activated PdSnPb. The FE of $CO_2$-to-formate was extensively studied in the literature under a variety of conditions (i.e., catalysts, cathode potentials, cathode superficial current densities, electrolyte composition, etc.). FE values as high as 95% were reported for Sn or Pb or SnPb. The lower formate generation FEs shown in FIG. 4(b) could arise from three possible sources. First, the incorporation of Pd in the catalyst layer is not beneficial to formate generation since Pd might not be catalytically active for reduction to formate. Second, the limited solubility of $CO_2$ in aqueous electrolytes (i.e., 34 mM at 1 atm and 298 K in distilled water) can lead to $CO_2$ starvation of the catalyst at high current densities (e.g., at −50 mA $cm^{-2}$) during prolonged tests. Third, formate losses due to crossover through the Nafion membrane to the counter electrode compartment. The thermo-catalytic dehydrogenation of formate on Pd has been discarded as a possible mechanism for formate loss due to sluggish kinetics at temperatures below 353 K.

Furthermore, in terms of net formate production rate on a geometric electrode area basis, the activated PdSnPb catalyst on $LaCoO_3$ support has shown the highest rate of 22.7 μM $cm^{-2}$ $min^{-1}$ (7.9 μmol $cm^{-2}$ $min^{-1}$) at −35 mA $cm^{-2}$ during 30 min. of testing (FIG. 4d), which is at least 15% higher than the production rates reported for Sn, Pb, SnPb compounds, In, Zn and bimetallic In—Zn nanocrystals in similar test setup conditions. However, when the formate production is normalized per catalyst mass, clearly the activated and $LaCoO_3$ supported PdSn is the best performing sample among those investigated here (FIG. 4e). Therefore, perovskite supported and activated PdSn and PdSnPb, respectively, were retained for battery experiments.

(d) $CO_2$ Redox Flow Battery (CRB)

Referring to FIG. 5, and in order to demonstrate the polarization behavior of the $CO_2$ redox battery a preliminary cell design was used with continuous flow of $CO_2$ gas to GDE coupled with batch liquid electrolytes, negolyte and posolyte, respectively. The custom made L-shaped electrode holder delivers the $CO_2$ gas to the tip holding tightly together a stainless steel current collector mesh, two teflonated carbon papers with embedded intermediate layers (Freudenberg H23C7) acting as gas distributors, and the GDE containing the bi-functional catalyst layer (FIG. 1c and FIG. 5). The membrane-electrode inter-spacing is about 5 mm on each side. An objective with this design was to develop a cell that allows fast and easy screening of different negative and positive electrode catalysts and membranes at different temperatures.

Figure 6B:
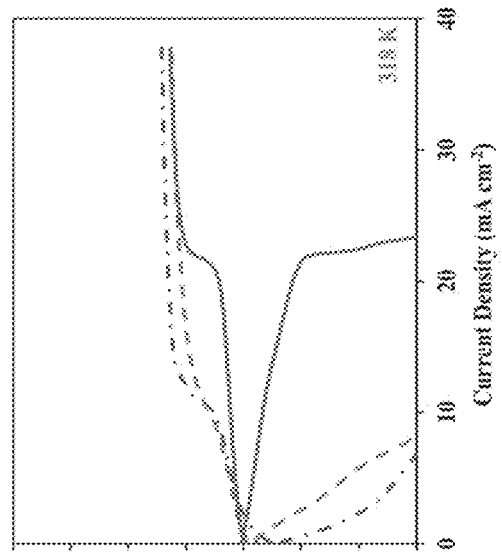
FIGS. 6(a) and (b) are graphs of experimental results showing the effect of LaCoO$_3$ intermediate support layer and electrochemical activation on the single-cell CRB charge and discharge polarization with electrodeposited PdSn bi-functional negative electrode catalyst at temperatures of 293 K (FIGS. 6(a)) and 318 K (FIG. 6(b)). Negolyte: 2 M KHCO$_3$+1 M KHCO$_2$. Posolyte: 0.3 M Br$_2$+2 M KBr. Membrane: Nafion 115. CO$_2$ flow rate: 3.17×10$^{-3}$ L min$^{-1}$ (SLM), 1 atm. Current sweep rate: 0.1 mA s$^{-1}$. Temperature: a) 293 K and b) 318 K. Catalyst loading: PdSn 6.6 mg cm-2. Polarization curves are ohmic potential drop-corrected.
Figure 6A:
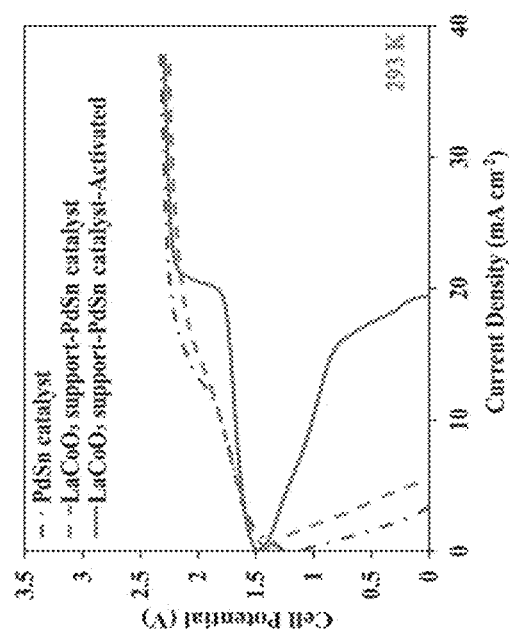
Figure 7A:
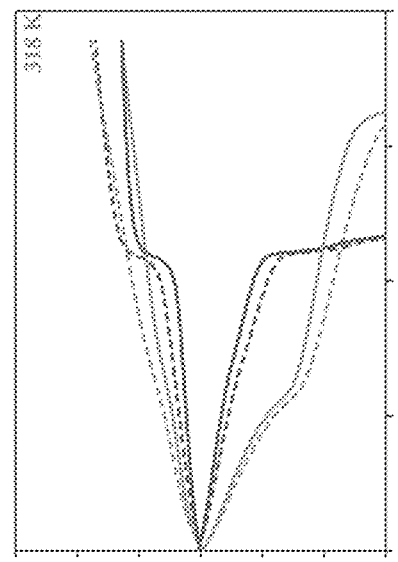
FIGS. 7(a)-(b) respectively show discharge/charge polarization curves of the single-cell CRB at 293 K and 318 K, and FIGS. 7(c) and (d) respectively show discharge power density curves at 293 K and 318 K using gas diffusion negative electrodes with LaCoO$_3$ supported and activated PdSn and PdSnPb electrodeposited bi-functional catalysts, respectively. Negolyte: 2 M KHCO$_3$+1 M KHCO$_2$ (pH of 8.03). Posolyte: 0.3 M Br$_2$+2 M KBr. Membrane: Nafion 115. CO$_2$ flow rate: 3.17×10-3 standard L min-1 (SLM). Current sweep rate: 0.1 mA s-1. At 293 K and 318 K. Catalyst loadings: PdSn (6.6 mg cm$^{-2}$) and PdSnPb (8 mg cm$^{-2}$). The solid and dashed lines refer to 100% and 0% ohmic potential drop correction, respectively.
Figure 7B:
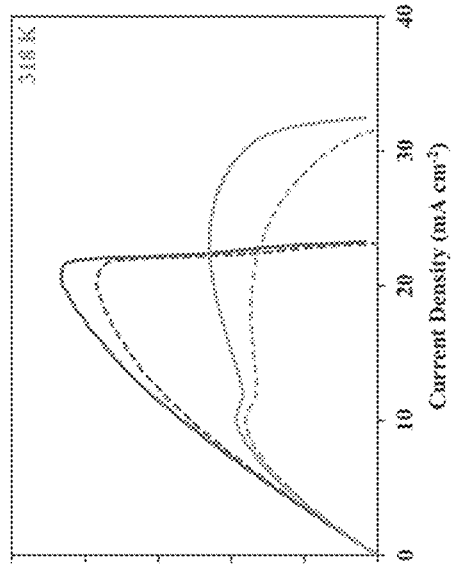
Figure 7C:
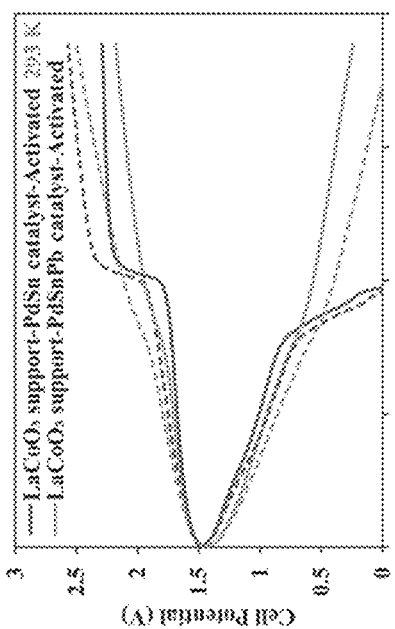
Figure 7D:
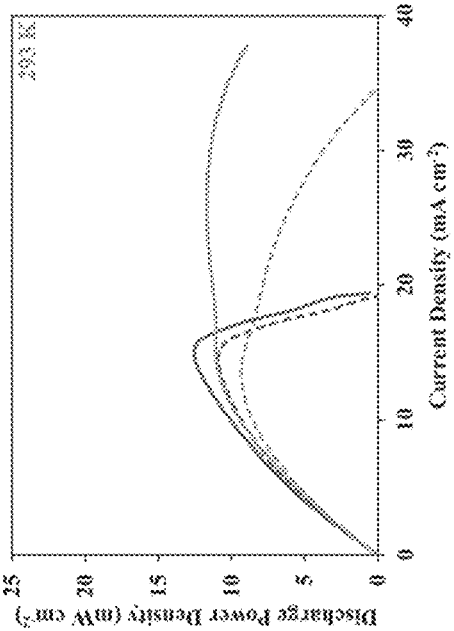

FIG. 6 compares the CRB discharge and charge performance for PdSn negative electrode catalyst with and without perovskite support and/or electrochemical activation. The polarization curves in FIG. 6 are all ohmic potential (or IR) drop-corrected to eliminate membrane and electrolyte resistivity effects. The open-circuit potential of the CRB is approximately 1.5 V, in very good agreement with the calculated equilibrium potential based on eqns. (1) to (6). The positive $Br_2/Br^-$ electrode has comparatively faster electrode kinetics, hence, the kinetic limitations of the battery can be mostly attributed to the negative battery electrode. The perovskite support and electrochemical activation presented in the previous sections are essential for decreasing the negative electrode activation overpotentials during battery discharge and charge, respectively. As a result, for the perovskite-supported and activated catalyst the discharge current density range is almost five times higher compared to the reference unsupported and unactivated PdSn (FIG. 6). For the charge step as well, the lower activation overpotential on the negative electrode with the perovskite-supported and activated catalyst, translates in lowering the battery charge voltage required at the same current density (FIG. 6).

A comparison of the battery performance with binary PdSn and ternary PdSnPb catalysts (both catalyst types are perovskite supported and electrochemically activated, as previously described), is shown by FIG. 7 with both IR-corrected and uncorrected (i.e., original) polarization curves. The CRB equipped with the $LaCoO_3$ supported and activated PdSn GDE produced the highest peak power densities at either 293 K or 318 K (FIG. 7). The peak power density obtained with PdSn is similar to the value obtained with Pd alone, but as discussed in the previous sections, with the Pd only catalyst the battery cannot be recharged (i.e., Pd is an unifunctional catalyst for formate oxidation only).

Furthermore, the discharge cell potential with PdSn dropped abruptly at superficial current densities higher than 15 or 20 mA $cm^{-2}$ (at 293 K and 318 K, respectively), in a manner reminiscent of mass transfer control. However, such an abrupt cell potential drop was not observed with either pure Pd or PdSnPb. This suggests that instead of mass transfer limitation the abrupt cell potential drop could be due to deactivation of specific PdSn sites. As discussed previously with regard to FIG. 2e, at high anode potentials during discharge (translating to battery cell potentials≤0.9 V, FIG. 6), $SnO_x$ and/or $Pd_xSn_yO_z$ are formed on the catalyst surface with lower activity toward formate oxidation (due to anodic passivation of Sn). On the other hand, this $SnO_x$ layer is beneficial for $CO_2RR$ to formate in the subsequent battery charging step as shown by the low battery charging voltage of about 1.65 V up to 20 mA $cm^{-2}$. At higher charging current densities (>20 mA $cm^{-2}$) the oxide layer is reduced generating a jump of about 0.3 V in the battery charge voltage (FIG. 7, PdSn catalyst case) since $CO_2RR$ to formate is less efficient on the reduced (metallic) surface. A similar jump in the charge voltage is observed for pure Sn as well, albeit it occurs at a lower charge current density (~5 mA $cm^{-2}$).

When Pb was added to the catalyst formulation, the discharge current densities could be increased two to three times compared to PdSn but with the drawback of lower power density (FIG. 7). Interestingly, PdSnPb was also much less sensitive to temperature increase (from 293 K to 318 K) compared to PdSn especially at superficial current densities higher than 10 mA $cm^{-2}$ (FIG. 7). This suggests that for the latter catalyst, the FOR mechanism could be different and steps other than electron transfer kinetics could be rate-limiting. Further studies are required to better understand these effects.

Looking at other emerging non-metal or $CO_2$ battery technologies (Table 1), the CRB with the preliminary batch-cell design presented here, provided four to nineteen times higher peak power densities compared to S-air and $CO_2$/$CH_4$—Zn, respectively. This clearly signifies the superior performance and transformative potential of the CRB as an emerging $CO_2$-utilizing, metal-free battery.

TABLE 1

Peak performance comparison of selected emerging new non-metal and $CO_2$ battery technologies

| Battery type | Open-circuit cell potential (V) | Peak discharge power density (mW $cm^{-2}$) @ current density (mA $cm^{-2}$) | Voltaic round-trip efficiency (and energy efficiency) at peak power (%) | T (K) |
|---|---|---|---|---|
| CRB | 1.5 | 21.6* @ 20.5<br>19.2 @ 20.5 | 61%*<br>(44.5%)*<br>50.5%<br>(36.7%) | 318 |
| S-air | 1.5 | 5.1 @ 7.1 | <10%<br>(NA) | 328 |
| $CO_2$/HCOOH—Zn | 0.89 | 5.8 @ 0.5 | ~40%<br>(NA) | 293 |
| $CO_2$/$CH_4$—Zn | 1 | 2.5 @ 1 | NA | 293 |

Figure 8B:
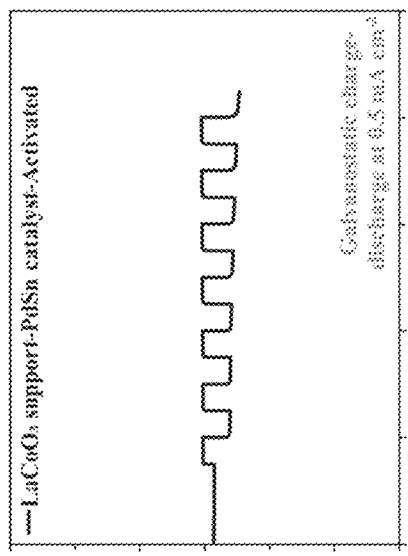
FIGS. 8(a)-(f) are graphs showing results from state of charge tests and galvanostatic polarization cycling on a single-cell CRB with LaCoO$_3$ supported and activated PdSn electrodeposited bi-functional catalysts, compared to Sn and Pd electrodeposited catalysts, respectively, wherein FIGS. 8 (a), (c) and (e) show state of charge tests starting with open-circuit potential (OCP) measurements followed by three stages of charging at 20 mA cm$^{-2}$ for 1 hour each and OCP-measurement breaks of 15 min. in 2 M KHCO$_3$ (negolyte) at 293 K, and FIGS. 8 (b), (d) and (f) show galvanostatic polarization cycling on the same electrodes at ±0.5 mA cm$^{-2}$ (5 min each).
Figure 8D:
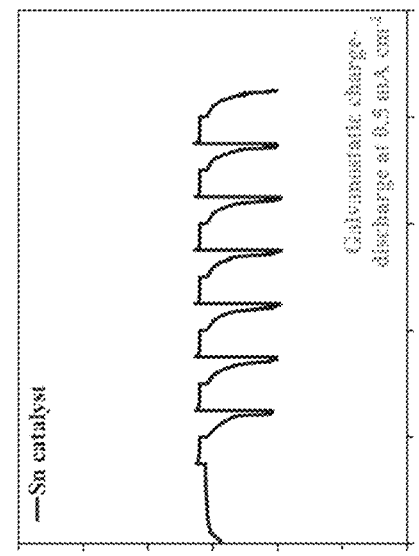
Figure 8A:
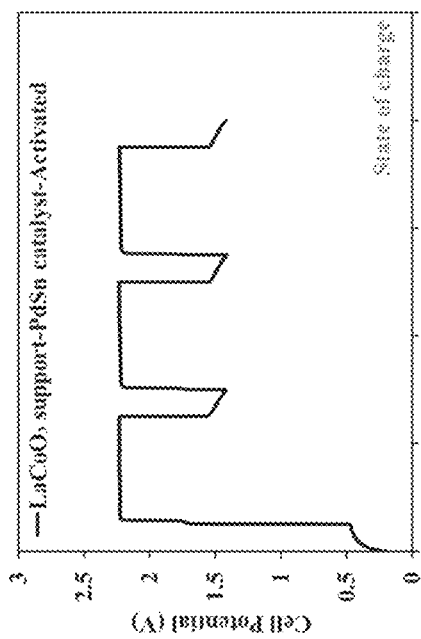
Figure 8C:
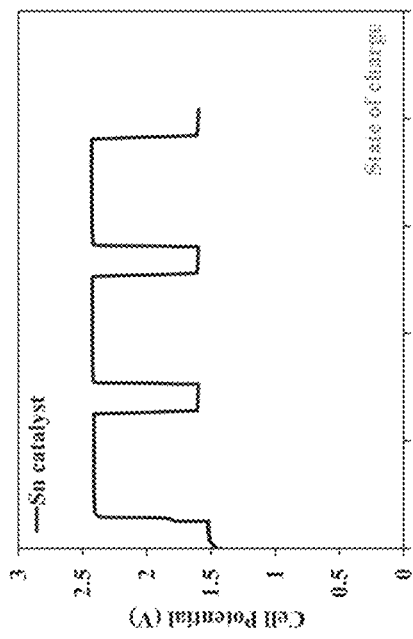

Referring to FIGS. 8(a)-(e), the charge/discharge capability of the CRB with $LaCoO_3$-supported and activated PdSn GDE was further investigated through state-of-charge and galvanostatic cycling experiments (FIGS. 8(a) and 8(b)). These results are compared to individual Sn and Pd GDEs, to further substantiate the bi-functionality. The activated PdSn had the lowest charge potential over three intermittent hours of charging at 20 mA $cm^{-2}$, i.e., 2.2 V, with an open-circuit potential (OCP) gain of 1 V during the first charge reaching a value of about 1.5 V, which indicates successful production of formate by $CO_2$ reduction. This corresponds to a net formate Faradaic efficiency of 73% and a net formate production rate of 18.25 µM $cm^{-2}$ $min^{-1}$ (4.56 µmol $cm^{-2}$ $min^{-1}$). The 64% increase in the net formate formation rate for the PdSn catalyst in the current setup compared to the flooded-cell experiments (FIG. 4) clearly shows the benefit of a two-phase gas-aqueous system compared to the aqueous only electrolyte with $CO_2$ gas solubility limitations. In terms of secondary reactions during battery charge, mainly the $H_2$ evolution reaction (HER) accounts for the Faradaic efficiency difference between 73 and 100%.

Figure 8E:
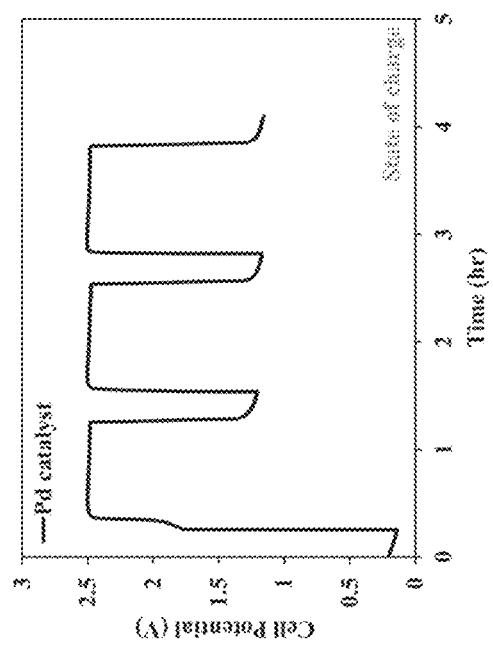
Figure 8F:
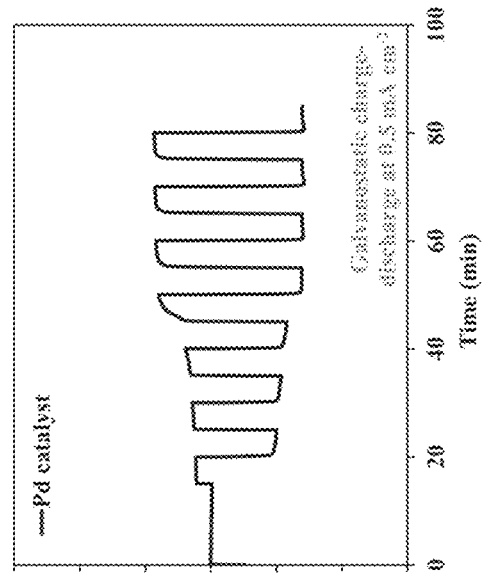

Further, galvanostatic charge-discharge steps at ±0.5 mA $cm^{-2}$ were applied to the aforementioned catalysts for one hour of testing (FIGS. 8b, 8d and 8e). The applied current was chosen to avoid any possible mass transfer limitations arising from the cell design with batch electrolytes (FIG. 5). The activated and $LaCoO_3$-supported PdSn GDE was the most stable, cycling between 1.5 V (at charge) and about 1.2 V (at discharge) with voltaic round-trip efficiencies (RTE) of 80-86% (FIG. 8b). At the low current densities of ±0.5 mA $cm^{-2}$ (FIG. 8(b)) the Faradaic efficiencies during charge and discharge are virtually 100%, hence, the voltaic RTE is essentially equal to the energy RTE. With Sn alone, being a catalyst for $CO_2RR$ to formate, charging the battery to an OCP of 1.6 V is possible (FIG. 8(c)), but the galvanostatic cycling demonstrates clearly that there is no discharge functionality due to the sharp cell potential drop during discharge (FIG. 8(d)). Conversely, Pd alone can be only charged to an OCP of approximately 1.3 V (FIG. 8(e)) at a high charge voltage of 2.5 V. The Pd GDE cycles between 1.9 V (at charge) and 0.8 V (discharge) with RTE of 41% following the $3^{rd}$ cycle (FIG. 8f). Overall, neither Pd nor Sn alone have suitable bi-functionality for the CRB.

Figure 9:
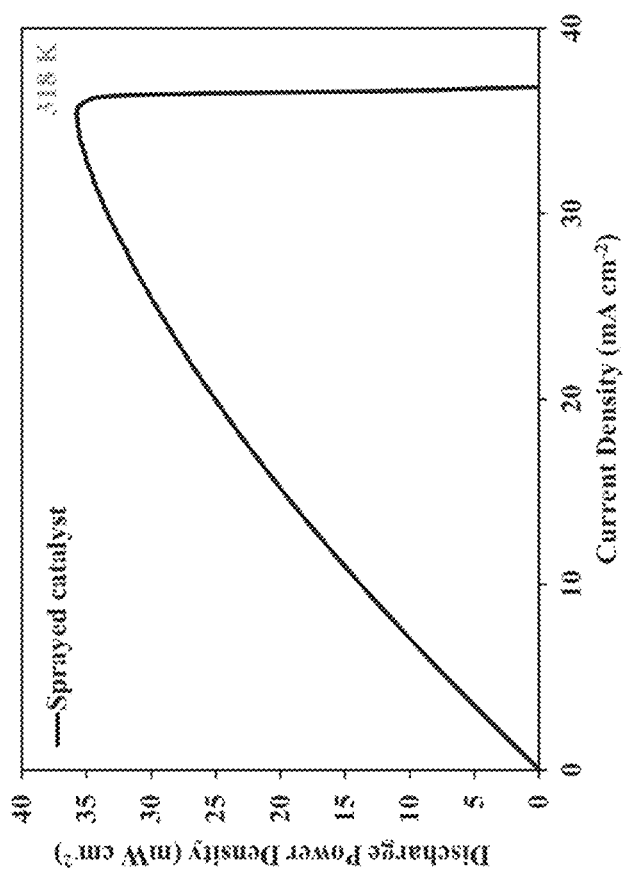
FIG. 9 is a graph showing the power density of the single-cell CRB equipped with an electrochemically activated gas diffusion negative electrode prepared by spraying the PdSn catalyst layer onto the LaCoO$_3$ intermediate layer, which in turn was prepared by spraying onto the base layer. Base layer: 40 wt % Teflon (PTFE)-treated carbon cloth; Intermediate layer: sprayed LaCoO$_3$:Vulcan XC-72:Nafion: PTFE at a weight ratio of 1:1:0.6:0.63; Catalyst layer: sprayed Pd/C:SnO$_2$ activated (1:1 weight ratio, loading of 2 mg cm$^{-2}$ each). Negolyte: 2 M KHCO$_3$+1 M KHCO$_2$ (pH of 8.03). Posolyte: 0.3 M Br$_2$+2 M KBr. Membrane: Fumasep FKD-PK-75. CO$_2$ flow rate: 3.17×10$^{-3}$ standard L min$^{-1}$ (SLM). Current sweep rate: 0.1 mA s$^{-1}$. No ohmic drop compensation is applied.

FIG. 9 shows the power density of the single-cell CRB when the CRB negative electrode catalyst layer was prepared by spraying in contrast to electrodeposition presented in the previous examples. The teflonated carbon cloth base layer was sprayed first with a layer containing $LaCoO_3$ (with a loading of 0.5 mg $cm^{-2}$) as the intermediate oxide support layer (FIG. 10). The ink composition included a mixture of $LaCoO_3$:Vulcan XC-72:Nafion:PTFE at a weight ratio of 1:1:0.6:0.63. The ink was sonicated for half an hour and then applied using a CNC-controlled sprayer machine on the carbon cloth at 45° C. The Vulcan XC-72 carbon black in the oxide intermediate layer can be replaced with other carbon-based materials alone or in combination such as: graphene, graphene oxide, carbon nanotube, Ketjenblack, graphitized carbon. The Nafion ionomer in the oxide intermediate layer can be replaced by other membrane ionomers with cation exchange, bipolar or anion exchange properties. After the intermediate layer was sprayed, the bi-functional catalyst layer containing Pd/C and $SnO_2$ powders mixed at a weight ratio of 1: was sprayed as well using the CNC-controlled sprayer on top of the intermediate layer such that to obtain a loading of 2 mg $cm^{-2}$ each of Pd/C and $SnO_2$, respectively. The ink composition for spraying the bi-functional catalyst layer contained in addition to Pd/C and $SnO_2$, PTFE, Nafion and Vulcan XC72. In one of the examples, the final composition of the bi-functional catalyst layer consists of: 26.5 wt. % Pd/C, 26.5 wt. % $SnO_2$, 26.5 wt. % Vulcan XC-72, 16.7 wt. % PTFE and 4 wt. % Nafion. The Vulcan XC-72 carbon black in the catalyst layer can be replaced with other carbon-based materials alone or in combination such as: graphene, graphene oxide, carbon nanotube, Ketjenblack, graphitized carbon. The Nafion ionomer in the catalyst layer can be replaced by other membrane ionomers with cation exchange, bipolar or anion exchange properties.

Comparing the electrodeposited and sprayed catalysts, it is concluded that the electrodeposited PdSn catalyst provides superior discharge and charge polarization performances for the $CO_2$ Redox Flow Battery (CRB). However, the spraying method, compared to the electrodeposition process, is easier and more feasible to scale up. Moreover, the sprayed catalyst has shown better durability.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment.

Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A redox flow battery comprising:
   (a) a negative electrode comprising a porous base layer, a bi-functional catalyst layer for electrochemical reduction of either $CO_2$ or carbonate to formate during battery charging and for formate oxidation to either carbonate or $CO_2$ during battery discharge, and a porous intermediate support layer situated between the porous base layer and the bi-functional catalyst layer and comprising a metal oxide and a carbon-based additive;
   wherein the carbon-based additive comprises one or more of carbon black, graphene, or carbon nanotubes; and
   wherein the metal oxide supports the bi-functional catalyst layer and comprises a non-platinum group material with no electrocatalytic activity toward formate oxidation reaction and poor electrocatalytic activity toward CO2 or carbonate reduction compared to PdSn, and further comprises:
       a perovskite structure with the formula $ABO_3$, wherein A is one or a mixture of La, Sr, and Ba and B is one of Co, Ti, Fe, Ni, Ga, Mg, In, Mn, Ta, or Ce; or
       a fluorite structure with the formula $ABO_7$, wherein A is Nd, and B is Ir;
   (b) a positive electrode; and
   (c) a cation exchange or bipolar membrane in between the negative and positive electrodes.

2. The redox flow battery as claimed in claim 1, wherein the bi-functional catalyst layer comprises one or more of: Pd, Sn, an intermetallic species with the formula $Pd_xSn_y$ and $SnO_2$.

3. The redox flow battery as claimed in claim 2 wherein the bi-functional catalyst layer further comprises In or Pb.

4. The redox flow battery as claimed in claim 2 wherein the bi-functional catalyst layer is electrodeposited on the porous intermediate support layer.

5. The redox flow battery as claimed in claim 4 wherein the bi-functional catalyst layer comprises polytetrafluoroethyelene (PTFE) and one or more carbon additives selected from a group consisting of: carbon black, graphene, graphene oxide, reduced graphene oxide, graphitized carbon and carbon nanotubes, with a PTFE to carbon additive weight ratio between 0.1:1 to 5:1.

6. The redox flow battery as claimed in claim 2 wherein the bi-functional catalyst layer is an ink sprayed on the porous intermediate support layer.

7. The redox flow battery as claimed in claim 6 wherein the bi-functional catalyst layer comprises polytetrafluoroethyelene (PTFE) and one or more carbon additives selected from a group consisting of: carbon black, graphene, graphene oxide, reduced graphene oxide, graphitized carbon and carbon nanotubes, with a PTFE to carbon additive weight ratio between 0.1:1 to 5:1.

8. The redox flow battery as claimed in claim 7, wherein the porous intermediate support layer comprises $LaCoO_3$ electrodeposited onto the porous base layer.

9. The redox flow battery as claimed in claim 8 wherein the porous intermediate support layer further comprises silicon with the formula $AxBySiO_4$, wherein A is one of Mg, Zr, and Ca, and B is one of Fe and Ni.

10. The redox flow battery as claimed in claim 8 wherein the metal oxide in the porous intermediate support layer comprises one of Ce, Zr, Al, and Ga.

11. The redox flow battery as claimed in claim 7 wherein the porous intermediate support layer comprises $LaCoO_3$ ink sprayed on the porous base layer.

12. The redox flow battery as claimed in claim 11 wherein the porous base layer is a teflonated carbon cloth or a carbon fiber paper.

13. The redox flow battery as claimed in claim 12 wherein the porous intermediate support layer comprises polytetrafluoroethylene (PTFE) and the carbon-based additive, with a PTFE to carbon additive weight ratio between 0.1:1 to 5:1.

14. The redox flow battery as claimed in claim 13 wherein the porous intermediate support layer comprises $LaCoO_3$ mixed with $MnO_2$.

15. The redox flow battery as claimed in claim 1, wherein the porous intermediate support layer comprises $LaNiO_3$ electrodeposited on the porous base layer.

16. The redox flow battery as claimed in claim 1, wherein the porous intermediate support layer comprises $LaNiO_3$ ink sprayed on the porous base layer.

17. The redox flow battery as claimed in claim 1, wherein the porous intermediate support layer comprises $LaNiO_3$ mixed with $MnO_2$.

18. A method for electrochemically activating a negative electrode of a redox flow battery that comprises the negative electrode, a positive electrode, and a cation exchange or bipolar membrane in between the negative and positive electrodes, the negative electrode comprising a porous base layer, a bi-functional catalyst layer for electrochemical reduction of either $CO_2$ or carbonate to formate during battery charging and for formate oxidation to either carbonate or $CO_2$ during battery discharge, and a porous intermediate support layer situated between the porous base layer and the bi-functional catalyst layer and comprising a metal oxide and a carbon-based additive, the metal oxide supporting the bi-functional catalyst layer and comprising a non-platinum group material with no electrocatalytic activity toward formate oxidation reaction and poor electrocatalytic activity toward $CO_2$ or carbonate reduction compared to PdSn, the metal oxide further comprising:
  a perovskite structure with the formula $ABO_3$, wherein A is one or a mixture of La, Sr, and Ba and B is one of Co, Ti, Fe, Ni, Ga, Mg, In, Mn, Ta, or Ce; or
  a fluorite structure with the formula $ABO_7$, wherein A is Nd, and B is Ir;
the carbon-based additive comprising one or more of carbon black, graphene, or carbon nanotubes; and
the method comprising: electrode potential sweeping between reduction and oxidation potentials or current pulsing between reduction and oxidation currents.

19. A method for manufacturing a bi-functional negative electrode for a redox flow battery, comprising:
  (a) providing a porous carbon base layer;
  (b) providing a deposition mixture for an intermediate support layer comprising a metal oxide material and a carbon based additive;
  the carbon based additive comprising one or more of carbon black, graphene or carbon nanotubes; and
  the metal oxide comprising a non-platinum group material with no electrocatalytic activity toward formate oxidation reaction and poor electrocatalytic activity toward $CO_2$ or carbonate reduction compared to PdSn, and further having:
    a perovskite structure with the formula $ABO_3$, wherein A is one or a mixture of La, Sr, and Ba and B is one of Co, Ti, Fe, Ni, Ga, Mg, In, Mn, Ta, or Ce; or
    a fluorite structure with the formula $ABO_7$, wherein A is Nd, and B is Ir;
  (c) providing a deposition mixture for a bi-functional porous catalyst layer comprising a bi-functional catalyst; and
  (d) depositing by electrodeposition or mechanical spraying the intermediate support layer deposition mixture onto the carbon base layer to form a porous intermediate support layer, followed by depositing by electrodeposition or mechanical spraying the catalyst layer onto the intermediate support layer creating a metal oxide supported catalyst.

\* \* \* \* \*